US011550387B2

(12) United States Patent
McCombe et al.

(10) Patent No.: US 11,550,387 B2
(45) Date of Patent: Jan. 10, 2023

(54) STEREO CORRESPONDENCE SEARCH

(71) Applicant: MINE ONE GmbH, Berlin (DE)

(72) Inventors: James A. McCombe, San Francisco, CA (US); Christoph Birkhold, San Francisco, CA (US)

(73) Assignee: MINE ONE GMBH, Berlin (DE)

( * ) Notice: Subject to any disclaimer, the term of this patent is extended or adjusted under 35 U.S.C. 154(b) by 0 days.

(21) Appl. No.: 16/769,148

(22) PCT Filed: Dec. 3, 2018

(86) PCT No.: PCT/US2018/063699
§ 371 (c)(1),
(2) Date: Jun. 2, 2020

(87) PCT Pub. No.: WO2019/109106
PCT Pub. Date: Jun. 6, 2019

(65) Prior Publication Data
US 2021/0232215 A1    Jul. 29, 2021

Related U.S. Application Data

(63) Continuation-in-part of application No. PCT/US2016/023433, filed on Mar. 21, 2016, which
(Continued)

(51) Int. Cl.
*G06F 3/01*      (2006.01)
*G06F 3/04815*   (2022.01)
(Continued)

(52) U.S. Cl.
CPC .............. *G06F 3/012* (2013.01); *G06F 3/013* (2013.01); *G06F 3/04815* (2013.01); *G06T 7/50* (2017.01); *G06T 11/00* (2013.01); *G06V 10/40* (2022.01); *G06V 20/13* (2022.01); *H04N 5/23229* (2013.01); *H04N 7/147* (2013.01); *H04N 7/18* (2013.01); *H04N 13/117* (2018.05); *H04N 13/239* (2018.05); *H04N 13/243* (2018.05); *H04N 13/254* (2018.05); *H04N 13/344* (2018.05); *G06T 2207/10048* (2013.01); *H04N 5/33* (2013.01); *H04N 13/271* (2018.05); *H04N 2013/0081* (2013.01)

(58) Field of Classification Search
CPC ....... G06F 3/013; H04N 13/243; G06T 11/00; G06K 9/0063
See application file for complete search history.

(56) References Cited

U.S. PATENT DOCUMENTS 9,280,821 B1      3/2016  Choe et al.
10,509,821 B2 *  12/2019  Boncyk .................. G06F 16/21
(Continued)

FOREIGN PATENT DOCUMENTS

EP      2847738       7/2017
WO      WO 00/54181 A1   9/2000

*Primary Examiner* — Bobbak Safaipour
(74) *Attorney, Agent, or Firm* — Jacobs & Kim LLP; David Jacobs

(57) ABSTRACT

Methods, systems, devices and computer software/program code products enable efficiently finding stereo correspondence between a feature or set of features in a first image or signal, and a search domain in a second image or signal.

17 Claims, 29 Drawing Sheets

Related U.S. Application Data is a continuation-in-part of application No. 16/749,989, filed on Jan. 22, 2020, now Pat. No. 11,106,275, which is a continuation of application No. 15/560,019, filed as application No. PCT/US2016/023433 on Mar. 21, 2016, now Pat. No. 10,551,913.

(60) Provisional application No. 62/594,006, filed on Dec. 3, 2017, provisional application No. 62/136,494, filed on Mar. 21, 2015.

(51) Int. Cl.
| | | |
|---|---|---|
| *G06T 7/50* | (2017.01) | |
| *G06T 11/00* | (2006.01) | |
| *G06V 10/40* | (2022.01) | |
| *G06V 20/13* | (2022.01) | |
| *H04N 5/232* | (2006.01) | |
| *H04N 13/254* | (2018.01) | |
| *H04N 13/117* | (2018.01) | |
| *H04N 13/239* | (2018.01) | |
| *H04N 13/243* | (2018.01) | |
| *H04N 7/14* | (2006.01) | |
| *H04N 7/18* | (2006.01) | |
| *H04N 13/344* | (2018.01) | |
| *H04N 13/271* | (2018.01) | |
| *H04N 5/33* | (2006.01) | |
| *H04N 13/00* | (2018.01) | |

(56) References Cited

U.S. PATENT DOCUMENTS

| | | | |
|---|---|---|---|
| 2004/0027358 A1* | 2/2004 | Nakao | G06T 11/40 345/422 |
| 2007/0126921 A1* | 6/2007 | Gallagher | G06T 5/20 348/E5.034 |
| 2010/0094800 A1* | 4/2010 | Sharp | G06N 5/02 706/55 |
| 2011/0115921 A1 | 5/2011 | Wang et al. | |
| 2011/0292227 A1* | 12/2011 | Nakazawa | G03B 35/10 348/E5.055 |
| 2012/0069005 A1* | 3/2012 | Seen | G06T 7/593 345/419 |
| 2012/0106785 A1* | 5/2012 | Karafin | G06T 11/00 382/164 |
| 2012/0293608 A1 | 11/2012 | Doepke et al. | |
| 2014/0219551 A1* | 8/2014 | Tang | G06K 9/6215 382/154 |
| 2014/0226900 A1* | 8/2014 | Saban | G06T 11/00 382/165 |
| 2015/0055821 A1* | 2/2015 | Fotland | G06V 40/103 382/103 |
| 2016/0005154 A1 | 1/2016 | Meyers et al. | |
| 2016/0042250 A1* | 2/2016 | Cordova-Diba | G06K 9/6201 382/199 |
| 2016/0103900 A1* | 4/2016 | Angelov | G06F 16/35 707/602 |
| 2016/0219267 A1* | 7/2016 | Chu | H04N 13/302 |
| 2018/0189550 A1* | 7/2018 | McCombe | G06V 40/166 |
| 2018/0307310 A1* | 10/2018 | McCombe | G06V 20/13 |
| 2018/0315232 A1* | 11/2018 | Jones | G06T 17/205 |
| 2021/0232215 A1* | 7/2021 | McCombe | G06V 10/40 |
| 2021/0241427 A1* | 8/2021 | McCombe | H04N 5/247 |

\* cited by examiner

```
min_error = greatest_of
(
    0.0,
    (search_signal_min_value-input_signal_max_value),
    (input_signal_min_value-search_signal_max_value)
)

max_error = greater_of
(
    absolute_value(input_signal_max_value-search_signal_min_value),
    absolute_value(search_signal_max_value-input_signal_min_value)
)
```

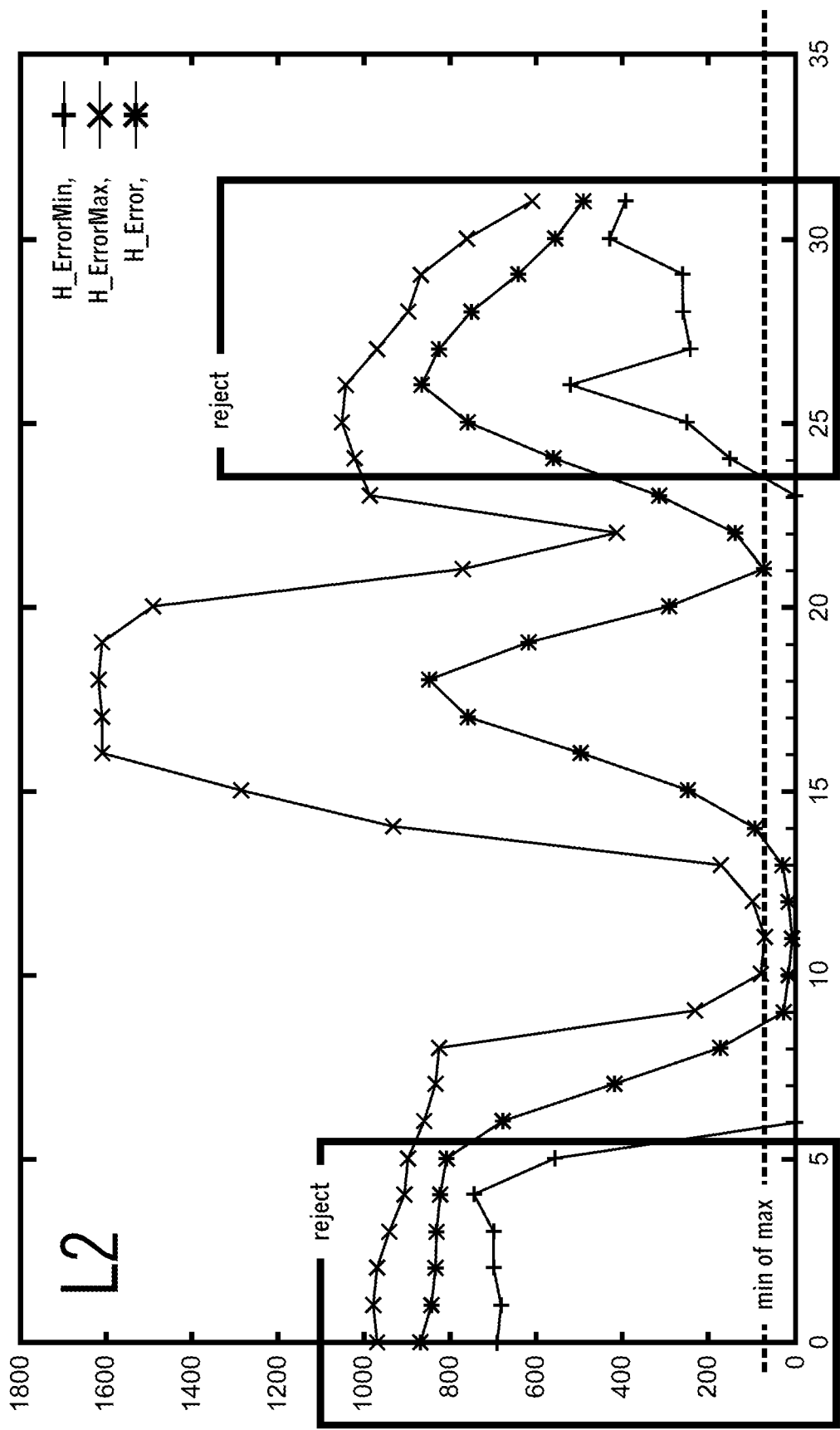

FIG. 5A

Search Signal Data 502

500

| 0.0 | 0.0 | 0.0 | 0.0 | 0.0 | 0.0 | 0.0 | 0.0 | 0.0 | 0.0 | 0.0 | 0.0 | 0.0 |
|---|---|---|---|---|---|---|---|---|---|---|---|---|
| 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 7.5 | 0.0 | 0.0 | 0.0 | 0.0 | 0.0 | 0.0 | 0.0 |
| 0.0 | 0.0 | 0.0 | 7.5 | 9.0 | 7.5 | 0.0 | 0.0 | 0.0 | 0.0 | 0.0 | 0.0 | 0.0 |
| 0.0 | 0.0 | 7.5 | 9.0 | 9.9 | 9.0 | 7.5 | 0.0 | 0.0 | 0.0 | 0.0 | 0.0 | 0.0 |
| 0.0 | 0.0 | 0.0 | 7.5 | 9.0 | 7.5 | 0.0 | 0.0 | 0.0 | 0.0 | 0.0 | 0.0 | 0.0 |
| 0.0 | 0.0 | 0.0 | 0.0 | 7.5 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 |

FIG. 5B

Bounds Mip Level 1 504

| Min: 0.0 Max: 0.0 | Min: 0.0 Max: 0.0 | Min: 0.0 Max: 0.0 | Min: 0.0 Max: 0.0 | Min: 0.0 Max: 0.0 | Min: 0.0 Max: 0.0 |
|---|---|---|---|---|---|
| Min: 0.0 Max: 0.0 | Min: 0.0 Max: 7.5 | Min: 0.0 Max: 9.0 | Min: 0.0 Max: 0.0 | Min: 0.0 Max: 0.0 | Min: 0.0 Max: 0.0 |
| Min: 0.0 Max: 0.0 | Min: 0.0 Max: 9.0 | Min: 7.5 Max: 9.9 | Min: 0.0 Max: 7.5 | Min: 0.0 Max: 0.0 | Min: 0.0 Max: 0.0 |
| Min: 0.0 Max: 0.0 | Min: 0.0 Max: 7.5 | Min: 0.0 Max: 0.0 | Min: 0.0 Max: 0.0 | Min: 0.0 Max: 0.0 | Min: 0.0 Max: 0.0 |
| Min: 0.0 Max: 0.0 | Min: 0.0 Max: 0.0 | Min: 0.0 Max: 0.0 | Min: 0.0 Max: 0.0 | Min: 0.0 Max: 0.0 | Min: 0.0 Max: 0.0 |
| Min: 0.0 Max: 0.0 | Min: 0.0 Max: 0.0 | Min: 0.0 Max: 0.0 | Min: 0.0 Max: 0.0 | Min: 0.0 Max: 0.0 | Min: 0.0 Max: 0.0 |

500

Bounds Mip Level 2 506

| Min: 0.0 Max: 7.5 | Min: 0.0 Max: 9.0 | Min: 0.0 Max: 0.0 |
|---|---|---|
| Min: 0.0 Max: 9.0 | Min: 0.0 Max: 9.9 | Min: 0.0 Max: 0.0 |
| Min: 0.0 Max: 0.0 | Min: 0.0 Max: 0.0 | Min: 0.0 Max: 0.0 |

600. SEARCHING FOR CORRESPONDENCE BETWEEN A FIRST SELECTED FEATURE IN A FIRST IMAGE AND AN ELEMENT WITHIN A SELECTED SEARCH DOMAIN IN A SECOND IMAGE:

601. UTILIZE MULTI-LEVEL AGGREGATE DIGITAL DATA STRUCTURE REPRESENTATIVE OF SECOND IMAGE, THE MULTI-LEVEL AGGREGATE DIGITAL DATA STRUCTURE COMPRISING DIGITAL DATA REPRESENTATIONS AT DIFFERENT RESOLUTIONS

602. COMPARE A RELATIVELY LOWER RESOLUTION DIGITAL DATA REPRESENTATION OF THE FIRST SELECTED FEATURE AGAINST A RELATIVELY LOWER RESOLUTION DIGITAL DATA REPRESENTATION OF A FIRST SELECTED SUBSET OF THE SELECTED SEARCH DOMAIN IN THE MULTI-LEVEL AGGREGATE DATA STRUCTURE, THE COMPARING COMPRISING COMPUTATION OF A MINIMUM DIFFERENCE VALUE AND A MAXIMUM DIFFERENCE VALUE

603. ITERATIVELY EXECUTE THE COMPARING (602) AGAINST OTHER SUBSETS OF THE SELECTED SEARCH DOMAIN

604. IDENTIFY A THRESHOLD DIFFERENCE VALUE BASED ON MAXIMUM DIFFERENCE VALUES FROM THE COMPARISONS AGAINST SUBSETS OF THE SELECTED SEARCH DOMAIN

605. REJECT SUBSETS FOR WHICH THE COMPARISON RESULTS IN MINIMUM DIFFERENCE VALUES THAT EXCEED THE IDENTIFIED THRESHOLD DIFFERENCE VALUE.

FIG. 6

700. DETERMINING DISPARITY BETWEEN A FIRST IMAGE AND A SECOND IMAGE:

701. GENERATE A MULTI-LEVEL AGGREGATE DIGITAL DATA STRUCTURE REPRESENTATIVE OF THE SECOND IMAGE, THE MULTI-LEVEL AGGREGATE DIGITAL DATA STRUCTURE COMPRISING DIGITAL DATA REPRESENTATIONS AT DIFFERENT RESOLUTIONS

702. SELECT A FIRST FEATURE FROM THE FIRST IMAGE

703. SEARCH FOR A CORRESPONDING ELEMENT WITHIN THE SECOND IMAGE, UTILIZING A SELECTED SEARCH METHOD, THE CORRESPONDING ELEMENT HAVING CORRESPONDENCE WITH THE SELECTED FEATURE FROM THE FIRST IMAGE

704. BASED ON RESULTS OF THE SEARCH, RECORD CORRESPONDENCE INFORMATION RELATING TO CORRESPONDENCE BETWEEN THE SELECTED FEATURE AND THE CORRESPONDING ELEMENT

705. ITERATIVELY EXECUTE THE SELECTING (702), THE SEARCHING (703) AND THE RECORDING (704), USING OTHER SELECTED FEATURES FROM THE FIRST IMAGE, TO CONSTRUCT A DIGITAL MAP OF CORRESPONDENCES FOR THE SELECTED FEATURES FROM THE FIRST IMAGE.

FIG. 7A

750. SELECTED SEARCH METHOD (USEFUL IN, E.G., ELEMENT 703 OF FIG. 7A):

751. COMPARE A RELATIVELY LOWER RESOLUTION DIGITAL DATA REPRESENTATION OF THE FIRST SELECTED FEATURE AGAINST A RELATIVELY LOWER RESOLUTION DIGITAL DATA REPRESENTATION OF A FIRST SELECTED SUBSET OF A SELECTED SEARCH DOMAIN IN THE MULTI-LEVEL AGGREGATE DATA STRUCTURE, THE COMPARING COMPRISING COMPUTATION OF A MINIMUM DIFFERENCE VALUE AND A MAXIMUM DIFFERENCE VALUE

752. ITERATIVELY EXECUTE THE COMPARING (751) AGAINST OTHER SUBSETS OF THE SELECTED SEARCH DOMAIN

753. IDENTIFY A THRESHOLD DIFFERENCE VALUE BASED ON MAXIMUM DIFFERENCE VALUES FROM THE COMPARISONS AGAINST SUBSETS OF THE SELECTED SEARCH DOMAIN

754. REJECT SUBSETS FOR WHICH THE COMPARISON RESULTS IN MINIMUM DIFFERENCE VALUES THAT EXCEED THE IDENTIFIED THRESHOLD DIFFERENCE VALUE

755. ITERATIVELY EXECUTE THE COMPARING (751), THE COMPARING (752), THE IDENTIFYING (753), AND THE REJECTING (754), USING HIGHER RESOLUTION DIGITAL DATA REPRESENTATIONS OF THE FIRST SELECTED FEATURE AND HIGHER RESOLUTION DIGITAL DATA REPRESENTATIONS IN THE MULTI-LEVEL AGGREGATE STRUCTURE

756. OUTPUT CORRESPONDENCE INFORMATION ASSOCIATED WITH THE SUBSET OF THE SEARCH DOMAIN FOR WHICH THE DIFFERENCE VALUE IS LOWEST

FIG. 7B

800. SEARCHING FOR CORRESPONDENCE BETWEEN A FIRST SELECTED FEATURE IN AN INPUT SIGNAL AND AN ELEMENT WITHIN A SELECTED SEARCH DOMAIN IN A SEARCH SIGNAL:

801. UTILIZE A MULTI-LEVEL AGGREGATE DIGITAL DATA STRUCTURE REPRESENTATIVE OF THE SEARCH SIGNAL, THE MULTI-LEVEL AGGREGATE DIGITAL DATA STRUCTURE COMPRISING DIGITAL DATA REPRESENTATIONS AT DIFFERENT RESOLUTIONS

802. COMPARE A RELATIVELY LOWER RESOLUTION DIGITAL DATA REPRESENTATION OF THE FIRST SELECTED FEATURE AGAINST A RELATIVELY LOWER RESOLUTION DIGITAL DATA REPRESENTATION OF A FIRST SELECTED SUBSET OF THE SELECTED SEARCH DOMAIN IN THE MULTI-LEVEL AGGREGATE DATA STRUCTURE, THE COMPARISON COMPRISING COMPUTATION OF A MINIMUM DIFFERENCE VALUE AND A MAXIMUM DIFFERENCE VALUE

803. ITERATIVELY EXECUTE THE COMPARING (802) AGAINST OTHER SUBSETS OF THE SELECTED SEARCH DOMAIN

804. IDENTIFY A THRESHOLD DIFFERENCE VALUE BASED ON MAXIMUM DIFFERENCE VALUES FROM THE COMPARISONS AGAINST SUBSETS OF THE SELECTED SEARCH DOMAIN

805. REJECT SUBSETS FOR WHICH THE COMPARISON RESULTS IN MINIMUM DIFFERENCE VALUES THAT EXCEED THE IDENTIFIED THRESHOLD DIFFERENCE VALUE.

FIG. 8

900. VARIANCE-AWARE SEARCHING FOR CORRESPONDENCE BETWEEN A FIRST SELECTED FEATURE IN A FIRST IMAGE AND AN ELEMENT WITHIN A SELECTED SEARCH DOMAIN IN A SECOND IMAGE:

901. UTILIZE A MULTI-LEVEL AGGREGATE DIGITAL DATA STRUCTURE REPRESENTATIVE OF THE SECOND IMAGE, THE MULTI-LEVEL AGGREGATE DIGITAL DATA STRUCTURE COMPRISING DIGITAL DATA REPRESENTATIONS AT DIFFERENT RESOLUTIONS

902. COMPARE A DIGITAL DATA REPRESENTATION OF THE FIRST SELECTED FEATURE, AT A GIVEN RESOLUTION, AGAINST A DIGITAL DATA REPRESENTATION OF A FIRST SELECTED SUBSET OF THE SELECTED SEARCH DOMAIN, AT A GIVEN RESOLUTION, IN THE MULTI-LEVEL AGGREGATE DATA STRUCTURE

903. DETERMINE, BASED ON THE COMPARING, A VARIANCE VALUE FOR THE FIRST SELECTED SUBSET

904. UTILIZE THE VARIANCE VALUE TO DETERMINE WHETHER TO EXECUTE ANOTHER COMPARING OPERATION IN A HIGHER RESOLUTION DIGITAL DATA REPRESENTATION IN THE MULTI-LEVEL AGGREGATE STRUCTURE, WHEREIN, IF THE DETERMINED VARIANCE VALUE IS LESS THAN A SELECTED THRESHOLD VALUE, THEN NOT EXECUTING ANOTHER COMPARING OPERATION FOR THE FIRST SELECTED SUBSET IN A HIGHER RESOLUTION DIGITAL DATA REPRESENTATION IN THE MULTI-LEVEL AGGREGATE STRUCTURE.

FIG. 9

1000. VARIANCE-AWARE SEARCHING FOR CORRESPONDENCE BETWEEN A FIRST SELECTED FEATURE IN AN INPUT SIGNAL AND AN ELEMENT WITHIN A SELECTED SEARCH DOMAIN IN A SEARCH SIGNAL:

1001. UTILIZE A MULTI-LEVEL AGGREGATE DIGITAL DATA STRUCTURE REPRESENTATIVE OF THE SEARCH SIGNAL, THE MULTI-LEVEL AGGREGATE DIGITAL DATA STRUCTURE COMPRISING DIGITAL DATA REPRESENTATIONS AT DIFFERENT RESOLUTIONS

1002. COMPARE DIGITAL DATA REPRESENTATION OF THE FIRST SELECTED FEATURE, AT A GIVEN RESOLUTION, AGAINST A DIGITAL DATA REPRESENTATION OF A FIRST SELECTED SUBSET OF THE SELECTED SEARCH DOMAIN, AT A GIVEN RESOLUTION, IN THE MULTI-LEVEL AGGREGATE DATA STRUCTURE

1003: DETERMINE, BASED ON THE COMPARING, A VARIANCE VALUE FOR THE FIRST SELECTED SUBSET

1004: UTILIZE THE VARIANCE VALUE TO DETERMINE WHETHER TO EXECUTE ANOTHER COMPARING OPERATION IN A HIGHER RESOLUTION DIGITAL DATA REPRESENTATION IN THE MULTI-LEVEL AGGREGATE STRUCTURE, WHEREIN, IF THE DETERMINED VARIANCE VALUE IS LESS THAN A SELECTED THRESHOLD VALUE, THEN NOT EXECUTING ANOTHER COMPARING OPERATION FOR THE FIRST SELECTED SUBSET IN A HIGHER RESOLUTION DIGITAL DATA REPRESENTATION IN THE MULTI-LEVEL AGGREGATE STRUCTURE.

FIG. 10

1100 LOSSLESS SEARCH FOR CORRESPONDENCE BETWEEN A FIRST SELECTED FEATURE IN A FIRST IMAGE AND AN ELEMENT WITHIN A SELECTED SEARCH DOMAIN IN A SECOND IMAGE:

1101. UTILIZE A FIRST MULTI-LEVEL AGGREGATE DIGITAL DATA STRUCTURE REPRESENTATIVE OF THE SELECTED FEATURE, THE FIRST MULTI-LEVEL AGGREGATE DIGITAL DATA STRUCTURE COMPRISING DIGITAL DATA REPRESENTATIONS AT DIFFERENT RESOLUTIONS

1102. UTILIZE A SECOND MULTI-LEVEL AGGREGATE DIGITAL DATA STRUCTURE REPRESENTATIVE OF A FIRST SELECTED SUBSET OF THE SELECTED SEARCH DOMAIN, THE SECOND MULTI-LEVEL AGGREGATE DIGITAL DATA STRUCTURE COMPRISING DIGITAL DATA REPRESENTATIONS AT DIFFERENT RESOLUTIONS

1103. COMPARE A DIGITAL DATA REPRESENTATION OF THE SELECTED FEATURE, AT A GIVEN RESOLUTION, TO A DIGITAL DATA REPRESENTATION OF THE FIRST SELECTED SUBSET OF THE SELECTED SEARCH DOMAIN, AT A GIVEN RESOLUTION, AND COMPUTE, BASED ON THE COMPARING, MINIMUM AND MAXIMUM ERROR FOR EACH ELIGIBLE DATA ELEMENT OF THE DIGITAL DATA REPRESENTATION AT THE GIVEN RESOLUTION IN THE MULTI-LEVEL AGGREGATE DIGITAL DATA STRUCTURE, WHEREIN AN DATA ELEMENT IS CONSIDERED TO BE INELIGIBLE IF A SUBSUMING DATA ELEMENT IN A CORRESPONDING LOWER RESOLUTION WAS INDICATED TO BE INELIGIBLE

1104. IF THE CURRENTLY EXECUTED COMPARISON WAS AT A HIGHEST POSSIBLE RESOLUTION, THEN DETERMINE THE LOWEST VALUE FOR THE ERROR, WHEREIN (1) THE ERROR DETERMINATION CAN INCORPORATE ERROR VALUES FROM MULTIPLE RESOLUTIONS OF THE MULTI-LEVEL AGGREGATE DIGITAL DATA STRUCTURE, AND (2) THE RESULT OF THE SEARCH IS A TRANSFORM THAT PRODUCES THE LOWEST ERROR.

FIG. 11

1200. SEARCHING FOR CORRESPONDENCE BETWEEN A FIRST SELECTED FEATURE IN A FIRST IMAGE AND AN ELEMENT WITHIN A SELECTED SEARCH DOMAIN IN A SECOND IMAGE:

1201. COMPARE A DIGITAL DATA REPRESENTATION OF THE SELECTED FEATURE FROM THE FIRST IMAGE AGAINST A DIGITAL DATA REPRESENTATION OF A SELECTED SUBSET OF THE SELECTED SEARCH DOMAIN IN THE SECOND IMAGE

1202. DETERMINE, FOR A GIVEN COMPARISON, AN ERROR VALUE CORRESPONDING TO THE GIVEN COMPARISON, THE ERROR VALUE BEING REPRESENTATIVE OF THE DEGREE TO WHICH THE SELECTED FEATURE FROM THE FIRST IMAGE CORRESPONDS WITH THE SELECTED SUBSET OF THE SELECTED SEARCH DOMAIN IN THE SECOND IMAGE WHEN THE COMPARING IS EXECUTED IN ACCORDANCE WITH SELECTED PROCESSING PARAMETERS

1203. ITERATIVELY EXECUTE THE COMPARING AND DETERMINING, WHILE APPLYING SELECTED CHANGES TO THE PROCESSING PARAMETERS ACROSS THE SELECTED SUBSET OF THE SELECTED SEARCH DOMAIN, UNTIL PROCESSING PARAMETERS RESULTING IN A SMALLEST ERROR VALUE ARE FOUND

1204. ESTIMATE MINIMUM AND MAXIMUM POSSIBLE ERRORS FOR CORRESPONDENCE FOR THE SELECTED FEATURE IN THE FIRST IMAGE AT A FULL RESOLUTION, BY EXECUTING THE COMPARING AND DETERMINING AT REDUCED RESOLUTION ON MULTI-LEVEL AGGREGATE DIGITAL DATA STRUCTURES REPRESENTATIVE OF THE FIRST IMAGE AND THE SELECTED SUBSET OF THE SELECTED SEARCH DOMAIN IN THE SECOND IMAGE, RESPECTIVELY

FIG. 12

1300. SEARCHING FOR A CORRESPONDENCE BETWEEN A FIRST SELECTED FEATURE IN A FIRST IMAGE AND AN ELEMENT WITHIN A SELECTED SEARCH DOMAIN IN A SECOND IMAGE:

1301. COMPARE A DIGITAL DATA REPRESENTATION OF THE SELECTED FEATURE FROM THE FIRST IMAGE AGAINST A DIGITAL DATA REPRESENTATION OF A SELECTED SUBSET OF THE SELECTED SEARCH DOMAIN IN THE SECOND IMAGE

1302. DETERMINE, FOR A GIVEN COMPARISON, AN ERROR VALUE CORRESPONDING TO THE GIVEN COMPARISON, THE ERROR VALUE BEING REPRESENTATIVE OF THE DEGREE TO WHICH THE SELECTED FEATURE FROM THE FIRST IMAGE CORRESPONDS WITH THE SELECTED SUBSET OF THE SELECTED SEARCH DOMAIN IN THE SECOND IMAGE WHEN THE COMPARING IS EXECUTED IN ACCORDANCE WITH SELECTED PROCESSING PARAMETERS

1303. ITERATIVELY EXECUTE THE COMPARING AND DETERMINING, WHILE APPLYING SELECTED CHANGES TO THE PROCESSING PARAMETERS ACROSS THE SELECTED SUBSET OF THE SELECTED SEARCH DOMAIN, UNTIL PROCESSING PARAMETERS RESULTING IN A SMALLEST ERROR VALUE ARE FOUND

1304. UTILIZE, IN EXECUTING THE COMPARING, A MULTI-LEVEL AGGREGATE DIGITAL DATA STRUCTURE CONTAINING DIGITAL DATA REPRESENTATIONS AT DIFFERENT RESOLUTION LEVELS.

FIG. 13

1400. MLADDS; COMPARISON FUNCTION, SEARCHING; OTHER ASPECTS (1401. MLADDS HAS CONFIGURATION SUBSTANTIALLY SIMILAR TO A MIP MAP.)

(1402. COMPARING UTILIZES A SELECTED ERROR FUNCTION.)

(1403. COMPARING UTILIZES A SELECTED COMPARISON FUNCTION.)

(1404. COMPARISON FUNCTION COMPRISES A KERNEL.)

(1405. APPLY ERROR FUNCTION IN EXECUTING THE COMPARING PRODUCES A SCALAR ERROR VALUE FOR A GIVEN TRANSFORM.)

(1406. ERROR FUNCTION COMPRISES A COMPARISON FUNCTION AND SELECTED LOGIC APPLICABLE TO WEIGHT RESULTS OF INDIVIDUAL COMPARISONS. )

(1407. SECOND IMAGE IS PRE-PROCESSED TO GENERATE A MLADDS STRUCTURE IN WHICH EACH ELEMENT IN A GIVEN RESOLUTION LEVEL SUBSUMES THE MINIMUM AND MAXIMUM VALUES FROM THE RESOLUTION LEVEL ABOVE THE GIVEN RESOLUTION LEVEL. )

(1408. MLADDS IS CHARACTERIZED BY A SELECTED REDUCTION RATIO.)

(1409. ONLY SELECTED RESOLUTION LEVELS OF THE MLADDS ARE CREATED IN AN INITIAL STRUCTURE GENERATING OPERATION.)

(1410. ONLY SELECTED LOWEST RESOLUTION LEVELS OF THE MLADDS STRUCTURE ARE GENERATED IN AN INITIAL STRUCTURE GENERATING OPERATION.)

(1411. ALL LEVELS OF THE MLADDS PROJECTED TO BE REQUIRED IN EXECUTING THE COMPARING ARE GENERATED IN AN INITIAL STRUCTURE GENERATING OPERATION.)

(1412. ALL LEVELS OF THE MLADDS ARE GENERATED IN AN INITIAL, DIGITAL AGGREGATION DATA STRUCTURE GENERATING OPERATION.)

(1412. EXECUTE A LOSSLESS SEARCH OPERATION USING THE MLADDS STRUCTURE.)

1501. IF THE CURRENTLY EXECUTED COMPARISON WAS NOT AT THE HIGHEST POSSIBLE RESOLUTION, SEARCHING FURTHER COMPRISES:

1501.1 DETERMINING THE LOWEST VALUE FOR THE MAXIMUM ERROR ACROSS EVERY ELEMENT IN THE MLADDS AT THE CURRENTLY SELECTED RESOLUTION;

1501.2 INDICATING THAT EACH ELEMENT FOR WHICH THE MINIMUM ERROR IS GREATER THAN THE DETERMINED LOWEST MAXIMUM ERROR IS INELIGIBLE;

1501.3 ACCESS A NEXT HIGHER RESOLUTION MLADDS REPRESENTATIVE OF THE FIRST IMAGE; AND

1501.4 RETURNING TO SELECTING A FEATURE FROM THE CURRENT RESOLUTION MLADDS STRUCTURE TO LOCATE WITHIN THE CORRESPONDING RESOLUTION MLADDS REPRESENTATIVE OF THE SECOND IMAGE.

FIG. 15

1600. LOSSLESS SEARCH, DOWN-SAMPLED VERSIONS, OTHER ASPECTS (1601. IN EXECUTING A LOSSLESS SEARCH, AGGREGATE DOWN-SAMPLED VERSIONS OF THE FIRST IMAGE, REPRESENTED BY A CURRENTLY SELECTED BOUNDS STRUCTURE, REPRESENT THE BOUNDS OF THE HIGHER RESOLUTION FIRST IMAGE ELEMENTS)

(1602. AGGREGATE DOWN-SAMPLED VERSIONS OF THE FIRST IMAGE REPRESENT THE BOUNDS OF THE HIGHER RESOLUTION FIRST IMAGE ELEMENTS IN A MANNER ANALOGOUS TO THE RESPECTIVE BOUNDS STRUCTURE REPRESENTING THE BOUNDS OF THE SECOND IMAGE)

(1603. EXECUTED COMPARISON FUNCTION CONSIDERS TWO RANGES, WHEREIN THE FIRST RANGE IS THE RANGE OF SUBSUMED VALUES FROM EACH ELEMENT IN THE FIRST IMAGE AND THE SECOND RANGE IS THE RANGE OF SUBSUMED VALUES FROM EACH ELEMENT IN THE SECOND IMAGE)

(1604. IF THE FIRST AND SECOND RANGES ARE DISJOINT, THE MINIMUM VALUE FOR THE ERROR IS BASED ON THE DISTANCE BETWEEN THE NEAREST POINTS IN EACH RANGE)

(1605. IF THE FIRST AND SECOND RANGES OVERLAP, THE MINIMUM ERROR CAN BE ZERO, AND THE MAXIMUM ERROR CAN BE BASED ON THE DISTANCE BETWEEN THE TWO POINTS IN EACH RANGE THAT ARE FURTHEST FROM EACH OTHER)

(1606. APPLYING VARIANCE AWARENESS TO DETERMINE WHETHER TO CONTINUE EXECUTION OF SEARCH OPERATIONS IN A NEXT-HIGHER RESOLUTION LEVEL OF A BOUNDS STRUCTURE)

(1607. VARIANCE IS DEFINED AS THE ABSOLUTE VALUE OF THE DIFFERENCE BETWEEN THE MINIMUM AND MAXIMUM VALUES CONTAINED IN A LOWER RESOLUTION ELEMENT OF THE BOUNDS STRUCTURE)

(1608. SELECT THRESHOLD FOR VARIANCE BELOW WHICH CORRESPONDING IMAGE DETAIL IS CONSIDERED IRRELEVANT)

(1609. VARIANCE THRESHOLD IS A SELECTED FIXED VALUE)

(1610. VARIANCE THRESHOLD IS DETERMINED, IN THE PROCESSING STRUCTURE, BASED ON PARAMETERS OF THE IMAGES OR OF THE DEVICES OR SYSTEMS FROM WHICH THE IMAGES ORIGINATE)

(1611. VARIANCE THRESHOLD IS DETERMINED BASED ON PHYSICAL PROPERTIES OF CAMERAS AND CAMERA PROCESSING ELEMENTS ASSOCIATED WITH A STEREO IMAGE DISPARITY SEARCH)

(1612. VARIANCE THRESHOLD IS DETERMINED BASED ON A SELECTED MODEL)

(1613. MODEL ALTERS THE VARIANCE THRESHOLD BASED ON SELECTED CRITERIA)

(1614. SELECTED CRITERIA COMPRISE ANY OF: ABSOLUTE SIGNAL VALUES CONTAINED WITHIN A CURRENTLY SELECTED ELEMENT OF A CURRENTLY SELECTED BOUNDS STRUCTURE; OVERALL IMAGE-REPRESENTATIVE VALUES ACROSS LARGER SECTIONS OF AN IMAGE BEING SEARCHED; AVAILABLE PROCESSING POWER; HUMAN PERCEPTUAL FACTORS; DISPLAY TECHNOLOGY CONSIDERATIONS; RELATIVE AND ABSOLUTE IMAGE POSITIONS; INPUTS FROM ADDITIONAL CONNECTED COMPONENTS; OR USER-SUPPLIED INPUTS OR HINTS)

FIG. 16

1700: VARIANCE THRESHOLD, OTHER ASPECTS (1701. ADJUST THE VARIANCE THRESHOLD BASED ON AVAILABILITY OF COMPUTATIONAL OR PROCESSING POWER OR RESOURCES)

(1702. ADJUST VARIANCE THRESHOLD TO SELECTIVELY PRIORITIZE EXECUTION OF COMPUTATIONAL OPERATIONS)

(1703. MLADDS STRUCTURE ELEMENTS WITH HIGHEST VARIANCE ARE DESIGNATED AS CANDIDATES FOR FURTHER REFINEMENT BASED ON HIGHER RESOLUTION VERSIONS OF A SELECTED IMAGE)

(1704. ITERATIVELY REPEAT THE DESIGNATING AS VARIANCES ASSOCIATED WITH ALL TRANSFORMS ACROSS A GIVEN IMAGE BEING PROCESSED BECOME SMALLER, SUCH THAT CORRELATIONS BETWEEN IMAGES ARE REFINED AS AVAILABLE COMPUTATIONAL OR PROCESSING POWER PERMITS)

FIG. 17

1800: MULTI-DIMENSIONAL ASPECTS, OTHER ASPECTS (1801. APPLY CORRESPONDENCE SEARCHING OPERATIONS TO MULTI-DIMENSIONAL IMAGE DATA)

(1802. IMAGE DATA HAS $N$ DIMENSIONS, AND $N$ IS EQUAL TO OR GREATER THAN 3)

(1803. APPLYING CORRESPONDENCE SEARCHING OPERATIONS TO MULTI-DIMENSIONAL IMAGE DATA COMPRISES: IN A DIGITAL PROCESSING STRUCTURE, SEARCH A MULTI-DIMENSIONAL IMAGE DATA FIELD USING A SELECTED COMPARISON KERNEL.)

(1804. USING A SELECTED COMPARISON KERNEL COMPRISES: EVALUATE THE SELECTED COMPARISON KERNEL; THEN, BASED ON THE EVALUATION, ASSOCIATING, WITH A REPRESENTATIVE ELEMENT OF THE KERNEL, A DESIGNATION OF ELIGIBILITY; AND THEN UTILIZE THE DESIGNATION OF ELIGIBILITY TO DETERMINE WHETHER THE REPRESENTATIVE ELEMENT, AND ANY CONTAINED HIGHER RESOLUTION ELEMENTS, SHOULD BE REJECTED FROM FURTHER CONSIDERATION)

(1805. IF A SELECTED RELATIVELY LOWER RESOLUTION ELEMENT IS DESIGNATED INELIGIBLE, REJECTING THE SELECTED LOWER RESOLUTION ELEMENT AND REJECTING ANY CORRESPONDING SUBSUMED HIGHER RESOLUTION ELEMENTS)

(1806. IF A SELECTED RELATIVELY LOWER RESOLUTION ELEMENT IS DESIGNATED ELIGIBLE, EXECUTE COMPARISON OPERATIONS ON CONTAINED HIGHER RESOLUTION ELEMENTS.)

(1807. EXPRESS AN $N$-DIMENSIONAL IMAGE DATA FIELD IN A FORM COMPRISING FEWER THAN $N$ DIMENSIONS, BY APPLYING A DIMENSION COLLAPSING OPERATION)

(1808. APPLYING A DIMENSION COLLAPSING OPERATION COMPRISES EXECUTING A SEARCH CHARACTERIZED BY A SELECTED SEARCH PATTERN)

(1809. SEARCH PATTERN COMPRISES A SCAN LINE SEARCH.)

(1810. SEARCH PATTERN COMPRISES A HILBERT CURVE.)

(1811. SEARCH PATTERN COMPRISES A MORTON ORDER.)

(1812. SUCCESSIVE SEARCH OPERATIONS ARE EXECUTED IN MULTIPLE PASSES THROUGH DATA TO BE SEARCHED.)

(1813. EVALUATION OF A COMPARISON KERNEL FINDS THE MINIMUM AND MAXIMUM ERROR FOR THE KERNEL.)

(1814. SUBSEQUENT PASS COMPRISES DETERMINING THE MINIMUM VALUE OF THE MAXIMUM ERROR FOR THE KERNEL, TO BE USED AS A THRESHOLD WHEN DETERMINING WHICH ELEMENTS ARE ELIGIBLE FOR FURTHER CONSIDERATION.)

(1815. FURTHER SUBSEQUENT PASS COMPRISES COMPARING ALL ELIGIBLE ELEMENTS AT A NEXT RESOLUTION LEVEL.)

FIG. 18

1900: EXECUTION OF PROCESSING OPERATIONS; OTHER ASPECTS

(1901. FIRST IMAGE, REPRESENTING AN INPUT IMAGE, IS PROCESSED TO CREATE A FIRST BOUNDS STRUCTURE; SECOND IMAGE, REPRESENTING A SEARCH IMAGE, IS PROCESSED TO CREATE A SECOND BOUNDS STRUCTURE; AND FEATURES FROM THE INPUT IMAGE AND ASSOCIATED FIRST BOUNDS STRUCTURE ARE SEARCHED WITHIN THE SEARCH IMAGE AND ASSOCIATED SECOND BOUNDS STRUCTURE BY EVALUATING A SELECTED COMPARISON KERNEL IN PARALLEL AGAINST AS MUCH OF THE SEARCH IMAGE AS POSSIBLE)

(1902. OPTIMIZE EXECUTION OF PROCESSING OPERATIONS TO SUBSTANTIALLY FULLY UTILIZE ALL AVAILABLE DIGITAL PROCESSING RESOURCES)

(1903. TESTS SELECTED FEATURE OF THE INPUT IMAGE AGAINST A SELECTED SEARCH DOMAIN IN THE SECOND IMAGE, AND GENERATE THEREFROM, RESULTANT ERROR VALUES; AND IF THE RESULTANT ERROR IS VALUE IS WITHIN A SELECTED THRESHOLD DESIGNATED FOR FURTHER PROCESSING, THEN CONTINUING PROCESSING AT A NEXT RESOLUTION LEVEL OF THE ASSOCIATED BOUNDS STRUCTURE)

(1904. OPTIMIZE EXECUTION OF PROCESSING OPERATIONS TO MINIMIZE COMPUTATIONAL WORK AND MEMORY TRAFFIC.)

(1905. MULTIPLE FEATURES OF THE INPUT IMAGE ARE TESTED IN PARALLEL AGAINST THE SELECTED SEARCH DOMAIN.)

(1906. PROCESSING OPERATIONS ARE EXECUTED IN ACCORDANCE WITH DIGITAL INSTRUCTIONS EXECUTING ON A COMPUTING DEVICE.)

(1907. COMPUTING DEVICE COMPRISES A GPU; A CPU; OR A TPU).

(1908. PROCESSING OPERATIONS ARE EXECUTED BY DEDICATED HARDWARE CIRCUITRY.)

(1909. DATA GENERATED FOR USE IN A GIVEN PROCESSING OPERATION ARE RETAINED FOR FUTURE USE.)

(1910. DATA FOR USE IN A GIVEN PROCESSING OPERATION ARE GENERATED ON AN AS-NEEDED BASIS.)

FIG. 19

2000. ADDITIONAL ASPECTS (2001. GENERATE FIRST BOUNDS STRUCTURE REPRESENTATIVE OF THE INPUT IMAGE AND A SECOND BOUNDS STRUCTURE REPRESENTATIVE OF THE SEARCH IMAGE; SELECTING A FIRST FEATURE FROM THE INPUT IMAGE TO LOCATE WITHIN A SELECTED SEARCH DOMAIN IN THE SEARCH IMAGE AND EXECUTING A SEARCH OPERATION FOR THE SELECTED FIRST FEATURE; AND SELECT ADDITIONAL FEATURE FROM THE GENERATED BOUNDS STRUCTURES AND EXECUTE A SEARCH OPERATION FOR THE ADDITIONAL FEATURE)

(2002. SEARCH OPERATION FOR THE ADDITIONAL FEATURE IS EXECUTED AFTER EXECUTION OF THE SEARCH OPERATION FOR THE SELECTED FIRST FEATURE.)

(2003. SEARCH OPERATION FOR THE ADDITIONAL FEATURE IS EXECUTED IN PARALLEL WITH THE SEARCH OPERATION FOR THE SELECTED FIRST FEATURE.)

(2004. RESULT OF A GIVEN SEARCH OPERATION IS A TRANSFORM INDICATING A BEST CORRESPONDENCE BETWEEN A FEATURE FROM THE INPUT IMAGE AND A BEST MATCH FOR THE INPUT IMAGE FEATURE IN THE SEARCH IMAGE.)

(2005. TRANSFORM IS INVERTIBLE TO GENERATE A CORRESPONDING TRANSFORM BETWEEN A CORRESPONDING FEATURE IN THE SEARCH IMAGE AND A CORRESPONDING FEATURE IN THE INPUT IMAGE.)

(2006. SELECTING A FIRST PORTION OF A GIVEN IMAGE TO BE A SEARCH IMAGE, AND SELECTING A SECOND, DIFFERENT PORTION OF THE GIVEN IMAGE TO BE AN INPUT IMAGE.)

(2007. APPLYING COMPARISON AND SEARCH PROCESSES ACROSS A PLURALITY OF IMAGES SIMULTANEOUSLY, SUCH THAT ONE INPUT IMAGE IS SIMULTANEOUSLY COMPARED FOR CORRESPONDENCE WITH MORE THAN ONE SEARCH IMAGE.)

(2008. APPLYING COMPARISON AND SEARCH PROCESSES ACROSS A PLURALITY OF IMAGES SIMULTANEOUSLY, SUCH THAT MULTIPLE INPUT IMAGES ARE SIMULTANEOUSLY COMPARED FOR CORRESPONDENCE WITH A GIVEN SEARCH IMAGE.)

(2009. INPUT IMAGE DIFFERS IN FORMAT FROM THE SEARCH IMAGE.)
(2010. INPUT SIGNAL AND SEARCH SIGNAL CAN BE 1-DIMENSIONAL SIGNALS.)

(2011. EXECUTING A TRANSFORM TO ENABLE COMPARISON BETWEEN AN INPUT IMAGE AND A SEARCH IMAGE OF DIFFERENT FORMATS.)

(2012. APPLIED COMPARISON FUNCTION ADAPTIVELY INTERPRETS DIFFERENT RESPECTIVE SETS OF DATA ASSOCIATED WITH EACH IMAGE, TO ENABLE COMPARISON BETWEEN AN INPUT IMAGE AND A SEARCH IMAGE OF DIFFERENT FORMATS.)

FIG. 20

2100. INPUT IMAGE/SIGNAL; SEARCH IMAGE/SIGNAL (2101. COMPARISON FUNCTION ENABLES COMPARISON OF AN INPUT SIGNAL AND A SEARCH SIGNAL.)

(2102. INPUT SIGNAL AND THE SEARCH SIGNAL ARE OF DIFFERENT FORMATS.)

(2103. EITHER THE INPUT SIGNAL OR THE SEARCH SIGNAL COMPRISES ANY OF: IMAGE DATA, PIXEL DEPTH DATA, 3-DIMENSIONAL POINT DATA, 3-DIMENSIONAL VERTEX DATA, LIDAR DATA, NEURAL NETWORK WEIGHTS, COMPUTER READABLE INSTRUCTIONS, ABSTRACT SIGNAL DESCRIPTIONS, COMPRESSED REPRESENTATIONS, AUDIO DATA, MARKET DATA, PRICE SIGNAL DATA, OR ANALYTICS.)

(2104. EITHER THE INPUT SIGNAL OR THE SEARCH SIGNAL COMPRISES A COMBINATION OF ANY OF: IMAGE DATA, PIXEL DEPTH DATA, 3-DIMENSIONAL POINT DATA, 3-DIMENSIONAL VERTEX DATA, LIDAR DATA, NEURAL NETWORK WEIGHTS, COMPUTER READABLE INSTRUCTIONS, ABSTRACT SIGNAL DESCRIPTIONS, COMPRESSED REPRESENTATIONS, AUDIO DATA, MARKET DATA, PRICE SIGNAL DATA, OR ANALYTICS.)

(2105. ONE OF THE INPUT SIGNAL OR THE SEARCH SIGNAL COMPRISES AN ABSTRACT REPRESENTATION DESCRIBING FEATURES OF THE GIVEN SIGNAL, AND THE OTHER SIGNAL COMPRISES IMAGE DATA.)

FIG. 21

2200. ADDITIONAL ASPECTS:

(2201. THE COMPUTATION OF A MINIMUM DIFFERENCE VALUE AND A MAXIMUM DIFFERENCE VALUE CAN COMPRISE COMPUTATION OF AN ESTIMATED MINIMUM DIFFERENCE VALUE AND AN ESTIMATED MAXIMUM DIFFERENCE VALUE.)

(2202. EXECUTING SEARCH AND FURTHER: ITERATIVELY EXECUTING THE COMPARING AND REJECTING ASPECTS, USING HIGHER RESOLUTION DIGITAL DATA REPRESENTATIONS OF THE FIRST SELECTED FEATURE AND HIGHER RESOLUTION DIGITAL DATA REPRESENTATIONS IN THE MULTI-LEVEL AGGREGATE STRUCTURE)

(2203. THE FIRST AND SECOND IMAGES ARE IMAGES CAPTURED BY AT LEAST ONE CAMERA FROM DIFFERENT VIEWPOINTS OF SUBSTANTIALLY THE SAME SCENE.)

(2204. THE SELECTED SEARCH DOMAIN IS SELECTED BASED ON THE RELATIVE POSITIONS OF THE RESPECTIVE VIEWPOINTS OF THE FIRST AND SECOND IMAGES.)

(2205. THE FIRST AND SECOND IMAGES ARE RECTIFIED TO A COMMON PROJECTION SUCH THAT SELECTED SEARCH DOMAIN WITHIN THE SECOND IMAGE IS ORIENTED ALONG A SELECTED AXIS OF THE SECOND IMAGE)

(2206. THE CORRESPONDENCE INFORMATION CAN BE A TRANSFORM)

(2207. THE CORRESPONDENCE INFORMATION CAN BE AN OFFSET REPRESENTING A POSITION WITHIN THE SEARCH DOMAIN.)

(2208. THE CORRESPONDENCE INFORMATION CAN BE A 2-DIMENSIONAL VALUE REPRESENTING A POSITION WITHIN AN IMAGE.)

(2209. THE CORRESPONDENCE INFORMATION CAN BE COMPUTED BASED ON A KNOWN DIFFERENCE IN VIEWPOINTS BETWEEN FIRST AND SECOND CAMERAS THAT CAPTURED THE FIRST AND THE SECOND IMAGE, RESPECTIVELY.)

(2210. THE CORRESPONDENCE INFORMATION CAN BE A DISPARITY VALUE REPRESENTING THE DISTANCE BETWEEN THE LOCATION OF THE FIRST SELECTED FEATURE IN THE FIRST IMAGE AND THE LOCATION OF THE CORRESPONDING ELEMENT IN THE SECOND IMAGE.)

(2211. THE SELECTED FEATURE CAN BE A PIXEL)

(2212. THE SELECTED FEATURE CAN BE A MATRIX OF PIXELS.)

(2213. THE MATRIX OF PIXELS CAN BE A STRUCTURE OF ADJACENT PIXELS.)

(2214. THE MULTI-LEVEL AGGREGATE DATA STRUCTURE CONTAINS ELEMENTS; EACH LOWER RESOLUTION ELEMENT COMPRISING THE MINIMUM AND MAXIMUM VALUES FOR ONE OR MORE HIGHER RESOLUTION ELEMENTS)

FIG. 22A

2200. ADDITIONAL ASPECTS, CONTINUED:

(2215. COMPARING A DIGITAL DATA REPRESENTATION OF THE SELECTED FEATURE FROM THE FIRST IMAGE, AT A GIVEN RESOLUTION, AGAINST A DIGITAL DATA REPRESENTATION OF A FIRST SELECTED SUBSET OF A SELECTED SEARCH DOMAIN IN THE SECOND IMAGE, AT A GIVEN RESOLUTION, IN THE MULTI-LEVEL AGGREGATE DIGITAL DATA STRUCTURE; DETERMINING, BASED ON THE COMPARING, A VARIANCE VALUE FOR THE FIRST SELECTED SUBSET; AND UTILIZING THE VARIANCE VALUE TO DETERMINE WHETHER TO EXECUTE ANOTHER COMPARING OPERATION IN A HIGHER RESOLUTION DIGITAL DATA REPRESENTATION IN THE MULTI-LEVEL AGGREGATE DIGITAL DATA STRUCTURE, WHEREIN, IF THE DETERMINED VARIANCE VALUE IS LESS THAN A SELECTED THRESHOLD VALUE, THEN NOT EXECUTING ANOTHER COMPARING OPERATION FOR THE FIRST SELECTED SUBSET IN A HIGHER RESOLUTION DIGITAL DATA REPRESENTATION IN THE MULTI-LEVEL AGGREGATE DIGITAL DATA STRUCTURE.)

(2216. ITERATIVELY EXECUTING THE COMPARING, IDENTIFYING AND REJECTING FUNCTIONS, USING HIGHER RESOLUTION DIGITAL DATA REPRESENTATIONS OF THE FIRST SELECTED FEATURE AND HIGHER RESOLUTION DIGITAL DATA REPRESENTATIONS IN THE MULTI-LEVEL AGGREGATE STRUCTURE, AND REJECTING COMPARISON RESULTS HAVING DIFFERENCE VALUES ABOVE THE THRESHOLD DIFFERENCE VALUE)

FIG. 22B

STEREO CORRESPONDENCE SEARCH

CROSS-REFERENCE TO RELATED APPLICATIONS AND INCORPORATION BY REFERENCE

This patent application is a 35 USC 371 National Stage of PCT Pat. App. PCT/US18/63699 filed Dec. 3, 2018, which claims the priority benefit of commonly owned U.S. Provisional Pat. App. 62/594,006 filed Dec. 3, 2017, entitled "Stereo Correspondence Search"; and is a continuation-in-part of PCT patent app. PCT/US16/23433 filed Mar. 21, 2016, entitled "Virtual 3D Methods, Systems And Software", published as WO/2016/154123, which claims the priority benefit of U.S. Provisional Pat. App. 62/136,494. This patent application is also a continuation-in-part of U.S. Pat. App. Ser. No. 16/749,989 filed Jan. 22, 2020 (U.S. Pat. No. 11,106,275), which is a continuation of U.S. Pat. App. Ser. No. 15/560,019 filed Sep. 20, 2017 (U.S. Pat. No. 10,551,913), which is a 371 National Stage of PCT/US16/23433.

This patent application is also related to commonly owned, PCT patent app. PCT/US16/32213 entitled "Facial Signature Methods, Systems and Software", published as WO/2016/183380, which claims the priority benefit of U.S. Provisional Pat. App. 62/160,563.

This application is also related to commonly owned, PCT patent application PCT/US18/19243 entitled "Image Reconstruction for Virtual 3D", published as WO/2018/164852, which claims the priority benefit of U.S. Prov. Pat. App. 62/462,307.

This application is also related to commonly owned, PCT patent app. PCT/US18/48197, entitled "Visual Communications Methods, Systems And Software", which claims the priority benefit of U.S. Provisional App. 62/550,685.

This application is also related to commonly owned, PCT patent app. PCT/US18/63531 entitled "Temporal De-Noising", which claims the priority benefit of U.S. Provisional App. 62/593,920.

This application is also related to commonly owned U.S. Provisional Application for Patent 62/595,055 filed Dec. 5, 2017, entitled "Disparity Cache".

Each of the above-listed patent applications is incorporated by reference herein as if set forth herein in its entirety, including all text and drawings thereof.

BACKGROUND OF THE INVENTION

It would be desirable to provide methods, systems, devices and computer software/program code products that enable efficiently finding stereo correspondence between a feature or set of features in a first image or signal, and a search domain in a second image or signal.

It would also be desirable to provide such functions at reasonable computational cost.

The present invention provides methods, systems, devices and computer software/program code products that enable the foregoing aspects and others.

Although embodiments and practices of the present invention discussed herein can be used in conjunction with practices and embodiments of the Virtual 3-D ("V3D") inventions described in the above-noted, commonly-owned patent applications incorporated herein by reference, they may also be useful in other systems and in connection with other technologies, and are not limited to application in connection with the V3D inventions described in the patent applications incorporated by reference herein.

Aspects, examples, embodiments and practices of the invention, whether in the form of methods, devices, systems or computer software/program code products, will next be described in greater detail in the following Detailed Description of the Invention, in conjunction with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

SUMMARY OF THE INVENTION

The present invention provides methods, systems, devices, and computer software/program code products suitable for a wide range of applications, including, but not limited to: facilitating video communications and presentation of image and video content in telecommunications applications; and facilitating video communications and presentation of image and video content for virtual reality (VR), augmented reality (AR) and head-mounted display (HMD) systems.

Methods, systems, devices, and computer software/program code products in accordance with the invention are suitable for implementation or execution in, or in conjunction with, commercially available computer graphics processor configurations and systems including one or more display screens for displaying images, cameras for capturing images, and graphics processors for rendering images for storage or for display, such as on a display screen, and for processing data values for pixels in an image representation. The cameras, graphics processors and display screens can be of a form provided in commercially available smartphones, tablets and other mobile telecommunications devices, as well as in commercially available laptop and desktop computers, which may communicate using commercially available network architectures including client/server and client/network/cloud architectures.

In the aspects of the invention described below and hereinafter, the algorithmic image processing methods described are executable by digital processors, which can include graphics processor units, including general purpose graphical processor units (GPGPUs) such as those commercially available on cellphones, smartphones, tablets and other commercially available telecommunications and computing devices, as well as in digital display devices and digital cameras. Those skilled in the art to which this invention pertains will understand the structure and operation of digital processors, GPGPUs and similar digital graphics processor units.

One aspect of the invention relates to methods, systems, devices and computer software/program code products operable to search for correspondence between a first selected feature in a first image and an element within a selected search domain in a second image, wherein the searching comprises: in a digital processing resource comprising a digital processor:

A) utilizing a multi-level aggregate digital data structure representative of the second image, the multi-level aggregate digital data structure comprising digital data representations at different resolutions;

B) comparing a relatively lower resolution digital data representation of the first selected feature against a relatively lower resolution digital data representation of a first selected subset of the selected search domain in the multi-level aggregate data structure, the comparing comprising computation of a minimum difference value and a maximum difference value;

C) iteratively executing the comparing (B) against other subsets of the selected search domain;

D) identifying a threshold difference value based on maximum difference values from the comparisons against subsets of the selected search domain; and E) rejecting subsets for which the comparison results in minimum difference values that exceed the identified threshold difference value.

In another aspect, the computation of a minimum difference value and a maximum difference value comprises computation of an estimated minimum difference value and an estimated maximum difference value.

Another aspect comprises iteratively executing the comparing (B), the comparing (C), the identifying (D), and the rejecting (E), using higher resolution digital data representations of the first selected feature and higher resolution digital data representations in the multi-level aggregate structure.

In another aspect, the first and second images are images captured by at least one camera from different viewpoints of substantially the same scene.

In another aspect, the selected search domain is selected based on the relative positions of the respective viewpoints of the first and second images.

In another aspect, the first and second images are rectified to a common projection such that selected search domain within the second image is oriented along a selected axis of the second image.

Another aspect of the invention relates to methods, systems, devices and computer software/program code products operable to determine disparity between a first image and a second image, the determining of disparity comprising: in a digital processing resource comprising a digital processor:

A) generating a multi-level aggregate digital data structure representative of the second image, the multi-level aggregate digital data structure comprising digital data representations at different resolutions;

B) selecting a first feature from the first image;

C) searching for a corresponding element within the second image, utilizing a selected search method, the corresponding element having correspondence with the selected feature from the first image;

D) based on results of the search, recording correspondence information relating to correspondence between the selected feature and the corresponding element; and E) iteratively executing the selecting (B), the searching (C) and the recording (D), using other selected features from the first image, to construct a digital map of correspondences for the selected features from the first image.

In another aspect, the selected search method comprises:

(i) comparing a relatively lower resolution digital data representation of the first selected feature against a relatively lower resolution digital data representation of a first selected subset of a selected search domain in the multi-level aggregate data structure, the comparing comprising computation of a minimum difference value and a maximum difference value;

(ii) iteratively executing the comparing (i) against other subsets of the selected search domain;

(iii) identifying a threshold difference value based on maximum difference values from the comparisons against subsets of the selected search domain; and (iv) rejecting subsets for which the comparison results in minimum difference values that exceed the identified threshold difference value.

In another aspect, the selected search method further comprises:

iteratively executing the comparing (i), the comparing (ii), the identifying (iii), and the rejecting (iv), using higher resolution digital data representations of the first selected feature and higher resolution digital data representations in the multi-level aggregate structure; and outputting correspondence information associated with the subset of the search domain for which the difference value is lowest.

In another aspect, the correspondence information is a transform.

In another aspect, the correspondence information is an offset representing a position within the search domain.

In another aspect, the correspondence information is a 2-dimensional value representing a position within an image.

In another aspect, the correspondence information is computed based on a known difference in viewpoints between first and second cameras that captured the first and the second image, respectively.

In another aspect, the correspondence information is a disparity value representing the distance between the location of the first selected feature in the first image and the location of the corresponding element in the second image.

In another aspect, the feature is a pixel.

In another aspect, the feature is a matrix of pixels.

In another aspect, the matrix of pixels is a structure of adjacent pixels.

In another aspect, the multi-level aggregate data structure contains elements; each lower resolution element comprising the minimum and maximum values for one or more higher resolution elements.

A related, further aspect of the invention comprises methods, systems, devices and computer software/program code products operable to: in a digital processing resource comprising a digital processor:

A) compare a digital data representation of the selected feature from the first image, at a given resolution, against a digital data representation of a first selected subset of a selected search domain in the second image, at a given resolution, in the multi-level aggregate digital data structure;

B) determine, based on the comparing, a variance value for the first selected subset; and C) utilize the variance value to determine whether to execute another comparing operation in a higher resolution digital data representation in the multi-level aggregate digital data structure, wherein, if the determined variance value is less than a selected threshold value, then not executing another comparing operation for the first selected subset in a higher resolution digital data representation in the multi-level aggregate digital data structure.

In another aspect, the multi-level aggregate digital data structure has a configuration substantially similar to the configuration of a MIP map.

In another aspect, the comparing utilizes a selected error function.

In another aspect, the comparing utilizes a selected comparison function.

In another aspect, the comparison function comprises a kernel.

In another aspect, applying the error function in executing the comparing produces a scalar error value for a given transform.

In another aspect, the error function comprises a comparison function and selected logic applicable to weight results of individual comparisons.

In another aspect, the second image is pre-processed to generate a multi-level aggregate digital data structure, in which each element in a given resolution level subsumes the minimum and maximum values from the resolution level above the given resolution level.

In another aspect, the multi-level aggregate digital data structure is characterized by a selected reduction ratio.

In another aspect, only selected resolution levels of the multi-level aggregate digital data structure are created in an initial structure generating operation.

In another aspect, only selected lowest resolution levels of the multi-level aggregate digital data structure are generated in an initial structure generating operation.

In another aspect, all, or substantially all, levels of the multi-level aggregate digital data structure projected to be required in executing the comparing are generated in an initial structure generating operation.

Another aspect of the invention relates to methods, systems, devices and computer software/program code products operable to search for correspondence between a first selected feature in an input signal and an dement within a selected search domain in a search signal, wherein the searching comprises: in a digital processing resource comprising a digital processor:

A) utilizing a multi-level aggregate digital data structure representative of the search signal, the multi-level aggregate digital data structure comprising digital data representations at different resolutions;

B) comparing a relatively lower resolution digital data representation of the first selected feature against a relatively lower resolution digital data representation of a first selected subset of the selected search domain in the multi-level aggregate data structure, the comparison comprising computation of a minimum difference value and a maximum difference value;

C) iteratively executing the comparing (B) against other subsets of the selected search domain;

D) identifying a threshold difference value based on maximum difference values from the comparisons against subsets of the selected search domain; and E) rejecting subsets for which the comparison results in minimum difference values that exceed the identified threshold difference value.

A related aspect comprises: iteratively executing the comparing (B), the comparing (C), the identifying (D), and the rejecting (E), using higher resolution digital data representations of the first selected feature and higher resolution digital data representations in the multi-level aggregate structure, and rejecting comparison results having difference values above the threshold difference value.

In another aspect, the input signal and the search signal are 1-dimensional signals.

In another aspect, the input signal and the search signal are of different formats.

In another aspect, either the input signal or the search signal comprises any of: image data, pixel depth data, 3-dimensional point data, 3-dimensional vertex data, LIDAR data, neural network weights, computer readable instructions, abstract signal descriptions, compressed representations, audio data, market data, price signal data, or analytics.

In another aspect, either the input signal or the search signal comprises a combination of any of: image data, pixel depth data, 3-dimensional point data, 3-dimensional vertex data, LIDAR data, neural network weights, computer readable instructions, abstract signal descriptions, compressed representations, audio data market data, price signal data, or analytics.

In another aspect, one of the input signal or the search signal comprises an abstract representation describing features of the given signal, and the other signal comprises image data.

Another aspect of the invention relates to methods, systems, devices and computer software/program code products operable to execute variance-aware searching for correspondence between a first selected feature in a first image and an element within a selected search domain in a second image, the searching comprising: in a digital processing resource comprising a digital processor:

A) utilizing a multi-level aggregate digital data structure representative of the second image, the multi-level aggregate digital data structure comprising digital data representations at different resolutions;

B) comparing a digital data representation of the first selected feature, at a given resolution, against a digital data representation of a first selected subset of the selected search domain, at a given resolution, in the multi-level aggregate data structure;

C) determining, based on the comparing, a variance value for the first selected subset; and D) utilizing the variance value to determine whether to execute another comparing operation in a higher resolution digital data representation in the multi-level aggregate structure, wherein, if the determined variance value is less than a selected threshold value, then not executing another comparing operation for the first selected subset in a higher resolution digital data representation in the multi-level aggregate structure.

In another aspect, determining a variance value comprises: utilizing a deviation calculation.

In another aspect, determining a variance value comprises: utilizing a squared deviation calculation.

In another aspect, determining a variance value comprises: calculating the variance based on a running standard deviation.

In another aspect, determining a variance value comprises: utilizing a heuristic.

In another aspect, the comparing is executed for a plurality of subsets of the selected search domain, and the determining comprises utilizing the results of the comparing.

Another aspect of the invention relates to methods, systems, devices and computer software/program code products operable to execute variance-aware searching for correspondence between a first selected feature in an input signal and an element within a selected search domain in a search signal, the searching comprising: in a digital processing resource comprising a digital processor:

A) utilizing as multi-level aggregate digital data structure representative of the search signal, the multi-level aggregate digital data structure comprising digital data representations at different resolutions;

B) comparing digital data representation of the first selected feature, at a given resolution, against a digital data representation of a first selected subset of the selected search domain, at a given resolution, in the multi-level aggregate data structure;

C) determining, based on the comparing, a variance value for the first selected subset; and D) utilizing the variance value to determine whether to execute another comparing operation in a higher resolution digital data representation in the multi-level aggregate structure, wherein, if the determined variance value is less than a selected threshold value, then not executing another comparing operation for the first selected subset in a higher resolution digital data representation in the multi-level aggregate structure.

In a related aspect, the variance is the absolute value of the difference between the minimum and maximum values contained in a lower resolution element of the multi-level aggregate digital data structure.

Another aspect comprises selecting a threshold for variance below which corresponding mage detail is treated as irrelevant.

In another aspect, the variance threshold is a selected fixed value.

In another aspect, the variance threshold is determined, in the processing structure, based on parameters of the images or of the devices or systems from which the images originate.

In another aspect, the variance threshold is determined based on physical properties of cameras and camera processing elements associated with a stereo image disparity search.

In another aspect, the variance threshold is determined based on a selected model.

In another aspect, the model alters the variance threshold based on selected criteria.

In another aspect, the selected criteria comprise any of: absolute signal values contained within a currently selected element of a currently selected multi-level aggregate digital data structure; overall image-representative values across larger sections of an image being searched; available processing power; human perceptual factors; display technology considerations; relative and absolute image positions; inputs from additional connected components; or user-supplied inputs or hints.

Another aspect comprises adjusting the variance threshold based on availability of computational or processing power or resources.

Another aspect comprises adjusting the variance threshold to selectively prioritize execution of computational operations.

In another aspect, multi-level aggregate digital data structure elements with highest variance are designated as candidates for further refinement based on higher resolution versions of a selected image.

Another aspect comprises iteratively repeating the designating, as variances associated with all transforms across a given image being processed become smaller, such that correlations between images are refilled as available computational or processing power permits.

Another aspect of the invention relates to methods, systems, devices and computer software/program code products operable to execute a lossless search for correspondence between a first selected feature in a first image and an element within a selected search domain in a second image, the searching comprising: in a digital processing resource comprising a digital processor:

A) utilizing a first multi-level aggregate digital data structure representative of the selected feature, the first multi-level aggregate digital data structure comprising digital data representations at different resolutions;

B) utilizing a second multi-level aggregate digital data structure representative of a first selected subset of the selected search domain, the second multi-level aggregate digital data structure comprising digital data representations at different resolutions;

C) comparing a digital data representation of the selected feature, at a given resolution, to a digital data representation of the first selected subset of the selected search domain, at a given resolution, and computing, based on the comparing, minimum and maximum error for each eligible data element of the digital data representation at the given resolution in the multi-level aggregate digital data structure, wherein an data dement is considered to be ineligible if a subsuming data dement in a corresponding lower resolution was indicated to be ineligible;

D) and if the currently executed comparison was at a highest possible resolution, then determining the lowest value for the error, wherein (1) the error determination can incorporate error values from multiple resolutions of the multi-level aggregate digital data structure, and (2) the result of the search is a transform that produces the lowest error.

In a related aspect, features are selected from a multi-level aggregate digital data structure representative of the first image; and if the currently executed comparison was not at the highest possible resolution, then accessing a next higher resolution digital data representation in the multi-level aggregate digital data structure representative of the first image to execute a subsequent comparison.

In another aspect, in executing a lossless search, aggregate down-sampled versions of the first image, represented by a currently selected multi-level aggregate digital data structure, represent the bounds of the higher resolution first image elements.

In another aspect, the aggregate down-sampled versions of the first image represent the bounds of the higher resolution first image elements in a manner analogous to the respective multi-level aggregate digital data structure representing the bounds of the second image.

In another aspect, the executed comparison function considers two ranges, wherein the first range is the range of subsumed values from each element in the first image and the second range is the range of subsumed values from each element in the second image.

In another aspect, if the first and second ranges are disjoint, the minimum value for the error is based on the distance between the nearest points in each range.

In another aspect, if the first and second ranges overlap, the minimum error can be zero, and the maximum error can be based on the distance between the two points in each range that are furthest from each other.

Another aspect of the invention relates to methods, systems, devices and computer software/program code products operable to search for a correspondence between a first selected feature in a first image and an element within a selected search domain in a second image, the searching comprising: in a digital processing resource comprising a digital processor:

(A) comparing a digital data representation of the selected feature from the first image against a digital data representation of a selected subset of the selected search domain in the second image;

(B) determining, for a given comparison, an error value corresponding to the given comparison, the error value being representative of the degree to which the selected feature from the first image corresponds with the selected subset of the selected search domain in the second image when the comparing is executed in accordance with selected processing parameters;

(C) iteratively executing the comparing and determining, while applying selected changes to the processing parameters across the selected subset of the selected search domain, until processing parameters resulting in a smallest error value are found; and (D) estimating minimum and maximum possible errors for correspondence for the selected feature in the first image at a full resolution, by executing the comparing and determining at reduced resolution on multi-level aggregate digital data structures representative of the first image and the selected subset of the selected search domain in the second image, respectively.

In another aspect, such operations are executed to determine a transform applicable to the selected feature in the first image such that the selected feature in the first image is matchable to the selected subset of the selected search domain of the second image with a level of error lower than a selected error threshold, the determined transform corresponding to the processing parameters resulting in the smallest error value.

Another aspect of the invention relates to methods, systems, devices and computer software/program code products operable to search for a correspondence between a first selected feature in a first image and an element within a selected search domain in a second image, the searching comprising: in a digital processing resource comprising a digital processor:

(A) comparing a digital data representation of the selected feature from the first image against a digital data representation of a selected subset of the selected search domain in the second image;

(B) determining, for a given comparison, an error value corresponding to the given comparison, the error value being representative of the degree to which the selected feature from the first image corresponds with the selected subset of the selected search domain in the second image when the comparing is executed in accordance with selected processing parameters;

(C) iteratively executing the comparing and determining, while applying selected changes to the processing parameters across the selected subset of the selected search domain, until processing parameters resulting in a smallest error value are found; and (D) utilizing, in executing the comparing, a multi-level aggregate digital data structure containing digital data representations at different resolution levels.

In another aspect, such operations are executed to determine a transform applicable to the selected feature in the first image such that the selected feature in the first image is matchable to the selected subset of the selected search domain of the second image with a level of error lower than a selected error threshold; wherein the determined transform corresponding to the processing parameters resulting in the smallest error value.

In another aspect, each resolution level contains at least one element, and in which a given element at a given resolution level can reference both minimum and maximum values of other elements subsumed within the given element at higher resolution levels of the multi-level aggregate digital data structure.

Another aspect further comprises: in a digital processing structure: applying correspondence searching operations to multi-dimensional data.

In another aspect, the image data has n dimensions, and n is greater than or equal to 2.

In another aspect, applying correspondence searching operations to multi-dimensional image data comprises: in a digital processing structure: searching a multi-dimensional image data field using a selected comparison kernel.

In another aspect, using a selected comparison kernel comprises: evaluating the selected comparison kernel; then, based on the evaluation, associating, with a representative element of the kernel, a designation of eligibility; and then utilizing the designation of eligibility to determine whether the representative element, and any contained higher resolution elements, should be rejected from further consideration.

Another aspect further comprises: if a selected relatively lower resolution element is designated ineligible, rejecting from further consideration the selected lower resolution element and rejecting any corresponding subsumed higher resolution elements.

Another aspect further comprises: if a selected relatively lower resolution element is designated eligible, executing comparison operations on contained higher resolution elements.

Another aspect further comprises: in a digital processing structure: expressing an n-dimensional image data field in a form comprising fewer than n dimensions, by applying a dimension collapsing operation.

In another aspect, applying a dimension collapsing operation comprises executing a search characterized by a selected search pattern.

In another aspect, the search pattern comprises a scan line search.

Another aspect further comprises executing a search characterized by a selected search pattern, wherein the search pattern comprises a scan line search.

Another aspect further comprises: executing a search characterized by a selected search pattern, wherein the search pattern comprises a scan line search.

In another aspect, the search pattern comprises a Hilbert curve.

In another aspect, the search pattern comprises a Morton order.

In another aspect, successive search operations are executed in multiple passes through data to be searched.

In another aspect, in one pass, evaluation of a comparison kernel finds a minimum and maximum error for the kernel.

In another aspect, a subsequent pass comprises determining a minimum value of the maximum error for the kernel, to be used as a threshold when determining which elements are eligible for further consideration.

In another aspect, a further subsequent pass comprises comparing all eligible elements at a next resolution level.

In another aspect, in a digital processing structure:

(A) the first image, representing an input image, is processed to create a first multi-level aggregate digital data structure;

(B) the second image, representing a search image, is processed to create a second multi-level aggregate digital data structure; and (C) features from the input image and associated first multi-level aggregate digital data structure are searched within the search image and associated second multi-level aggregate digital data structure by evaluating a selected comparison kernel in parallel against as much of the search image as possible.

Another aspect further comprises: optimizing execution of processing operations to substantially fully utilize all available digital processing resources.

Another aspect further comprises:

(A) testing a selected feature of the input image against a selected search domain in the second image, and generating, based on the testing, resultant error values: and (B) if the resultant error is value is within a selected threshold designated for further processing, then continuing processing at a next resolution level of the associated multi-level aggregate digital data structure.

Another aspect further comprises: optimizing execution of processing operations to minimize computational work and memory traffic.

In another aspect, multiple features of the input image are tested in parallel against the selected search domain.

In another aspect, processing operations are executed in accordance with digital instructions executing on a computing device.

In another aspect, the computing device comprises a GPU (General Processing Unit).

In another aspect, the computing device comprises a CPU (Central Processing Unit).

In another aspect, the computing device comprises a TPU (Tensor Processing Unit).

In another aspect, processing operations are executed by dedicated hardware circuitry.

In another aspect, data generated for use in a given processing operation are retained for future use.

In another aspect, data for use in a given processing operation are generated on an as-needed basis.

Another aspect further comprises: in a digital processing resource:

(A) generating a first multi-level aggregate digital data structure representative of the input image and a second multi-level aggregate digital data structure representative of the search image;

(B) selecting a first feature from the input image to locate within a selected search domain in the search image and executing a search operation for the selected first feature; and (C) selecting an additional feature from the generated multi-level aggregate digital data structures and executing a search operation for the additional feature.

In another aspect, a search operation for the additional feature is executed after execution of the search operation for the selected first feature.

In another aspect, the search operation for the additional feature is executed in parallel with the search operation for the selected first feature.

In another aspect, the result of a given search operation is a transform indicating, a best correspondence between a feature from the input image and a best match for the input image feature in the search image.

In another aspect, the transform is invertible to generate a corresponding transform between a corresponding feature in the search image and a corresponding feature in the input image.

Another aspect further comprises selecting a first portion of a given image to be a search image, and selecting a second, different portion of the given it to be an input image.

Another aspect further comprises: applying comparison and search processes across a plurality of images simultaneously, such that one input image is simultaneously compared for correspondence with more than one search image.

Another aspect further comprises; implying comparison and search processes across a plurality of images simultaneously, such that multiple input images are simultaneously compared for correspondence with a given search image.

In another aspect, the input image differs in format from the search image.

Another aspect further comprises: executing a transform to enable comparison between an input image and a search image of different formats.

In another aspect, the applied comparison function adaptively interprets different respective sets of data associated with each image, to enable comparison between an input image, and a search image of different formats.

The present invention enables the features described herein to be provided at reasonable computational cost, and in a manner easily accommodated within the digital processing, capabilities and form factors of modern mobile devices such as tablets and smartphones, as well as the form factors of laptops, PCs, computer-driven televisions, computer-driven projector devices, and the like, does not dramatically alter the economics of building such devices, and is viable within current or near-current communications network/connectivity architectures.

These and other aspects, examples, embodiments and practices of the invention, whether in the form of methods, devices, systems or computer software/program code products, will be discussed in greater detail below in the following Detailed Description of the Invention and in connection with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIG. 3 depicts computational functions, in accordance with the invention, that represent one possible method for calculating minimum and maximum error values when comparing two elements, each expressing minimum and maximum signal hounds values.

FIG. 5 is a schematic diagram depicting operations performed, in accordance with an exemplary practice of the invention, to search a two-dimensional (2-D) image or image signal.

FIGS. 6-22 are flowcharts depicting exemplary practices of the invention.

DETAILED DESCRIPTION OF THE INVENTION

Overview

Figure 1:
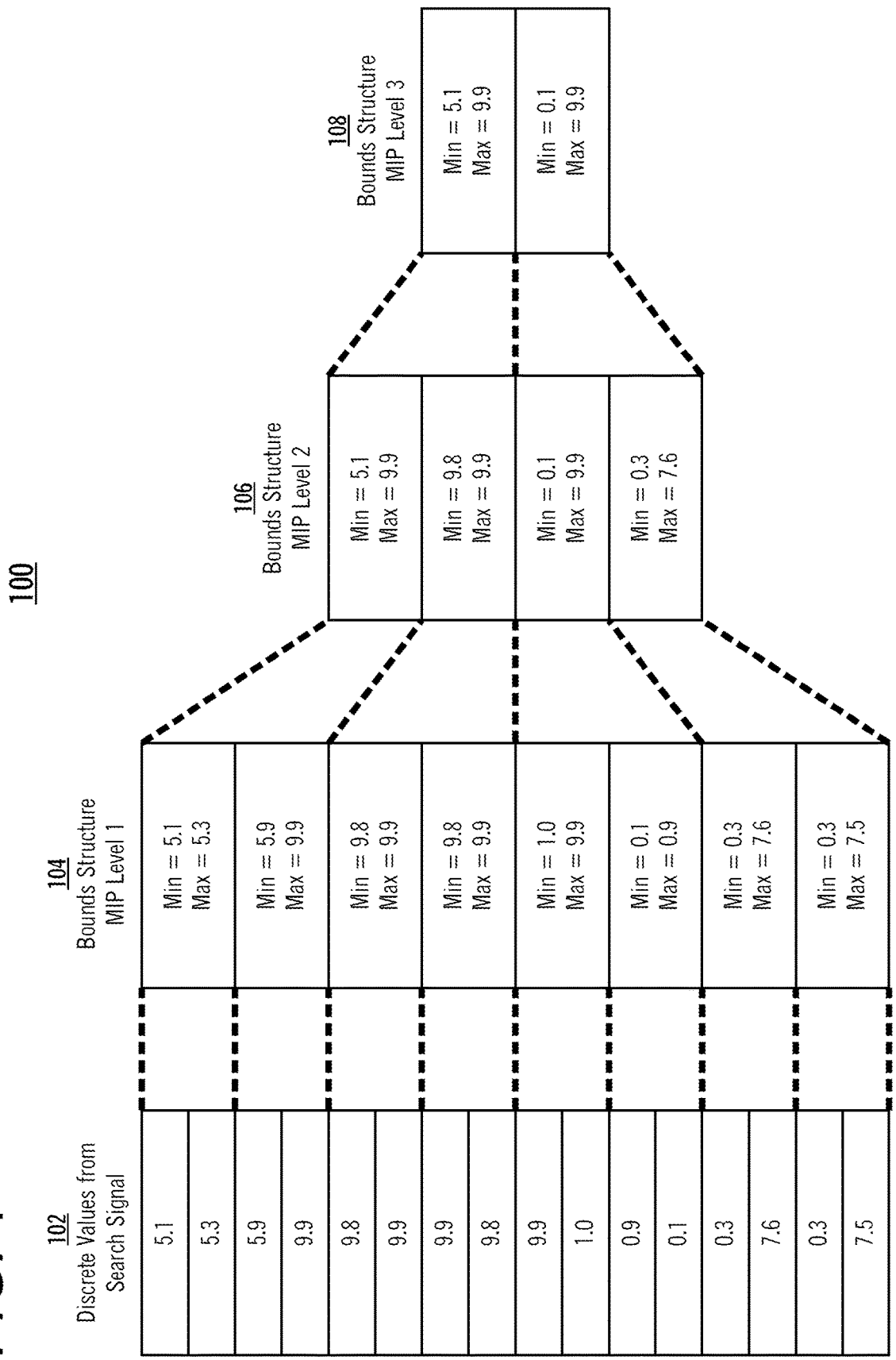
FIG. 1 is a schematic block diagram depicting a MLADDS structure in accordance with an exemplary practice of the invention.

The present invention relates to methods systems, devices and computer software/program products that enable efficiently finding stereo correspondence between a feature or set of features in a first signal, and a search domain in a second signal. The process of finding an acceptable correspondence results in the determination of the transformation (often a position or translation) for the feature from the first signal, such that it matches a part of the second signal with an acceptable error. In accordance with exemplary practices and embodiments of the present invention, this is accomplished by estimating the minimum and maximum possible errors for correspondence between features at a full resolution, by performing correspondence testing at reduced resolution on aggregations of the signal data.

With regard to the terms "difference values", "error values" and "error functions": A comparison between a feature at a given resolution and an element in a multi-level aggregate digital data structure (MLADDS) may result in a difference value indicating the difference between the feature and the element being compared. Thus, comparisons with low difference values can be said to have low error values, because there is a more precise match between the feature and the element. When a comparison function is applied across an entire search domain at a given resolution, it can be called an error function. A 2-dimensional plot of the values of the error function can be used to identify the elements within the search domain of the lowest error or best correspondence between the feature and the element.

Stereo Correspondence Searching Using Linear Search

One known technique for determining stereo correspondence between an input signal and a search signal is to perform a linear search. In such a search, a portion of the input signal is transformed and compared for errors against the corresponding part of the search signal using a comparison function or an error function. Changes to the transform parameters are iteratively applied in a linear fashion across the entire possible domain being searched, and the transform parameters resulting in the smallest error are chosen for that portion of the input signal.

In this Detailed Description of the present invention, a portion of the input signal or a processed version of the signal for which the algorithm is searching for a corresponding match can be referred to, various, as a "feature" or as a "snippet."

The comparison function is often a kernel. An error function is any function that produces a scalar error value for a given transform, and can include one or more comparison functions along with logic to interpret or weight the results of the individual comparisons.

Multi-Resolution Error Function

Building on the foregoing, the linear search can be applied to multiple resolutions of the input signal and the search signal, as taught by the Applicants' commonly owned patent applications listed above and incorporated herein by reference. Further, an error function that combines the results from comparisons of the signal at more than one resolution can increase the accuracy of the overall results. This is due to the fact that false error function minima found at a high resolution can be caused by repeating patterns.

Repeating patterns may cause a problem if the pattern size is greater than the size of the comparison function or kernel. By including data from comparisons of a lower resolution version of the signal in the overall error function, the search is able to account for the proverbial "forest" as well as the "trees."

The process by which a lower resolution signal is produced from a high resolution signal can vary, but can utilize averaging, down-sampling, or applying a low-pass filter. The lower resolution version of a signal can be referred to as an aggregate signal or a downsampled signal. The technique of parallel searching across multiple resolutions produces good results, but is computationally very costly.

An aspect of the present invention is that, unlike executing the search operation in each resolution as an independent process, in exemplary practices of the present invention each resolution is searched serially, Where the search at a higher resolution is predicated on the results of the search at the lower resolution.

Problems with Conventional Refinement Search

A known optimization that can be employed is a refinement search to reduce the computational cost of the search operation. In a refinement search, the search space is sampled first at a coarse resolution, and then higher resolution samples are taken only when the error is below a threshold. This process is repeated for successively higher resolutions until a final result is determined from samples in a high resolution version of the signal.

This is a valid optimization, but it requires a threshold value appropriate for the signal being examined. Furthermore, it susceptible to sampling errors that occur when the Nyquist frequency of the signal exceeds the frequency of the lower resolution sampling. Under-sampling can lead to the issue of potentially missing a high frequency global maximum (or error minimum), in favor of a lower frequency local maximum tor error minimum) elsewhere.

In a search signal that represents an image, this type of error might result in the search ignoring a small object because it does not make a distinct contribution to a low resolution representation of the image.

With regard to the terms "image" and "signal" as used herein: where this documents refers to processing of an image in accordance with the present invention, the same operations can be applied to processing of a signal in accordance with the invention, and the term "signal" can be used in place of the term "image" where this document speaks of processing of an image in accordance with the invention. Further, by way of example, such signals, which can be processed by the invention, can comprise, but are not limited to, any of the following: image data, pixel depth data, 3-dimensional point data, 3-dimensional vertex data, LIDAR data, neural network weights, computer readable instructions, abstract signal descriptions, compressed representations, audio data, market data, price signal data, or analytics.

Multi-Level Aggregate Data Structure (MLADDS)/Bounds Structure

To solve the problems associated with a refinement search, exemplary practices of the present invention employ a multi-level aggregate digital data structure (MLADDS), of which a bounds structure is one form. A MLADDS is a multi-resolution representation of the signal in which each element at a given level can reference both the minimum and maximum values of the elements contained within it at all higher resolutions. Certain aspects of a bounds structure or MLADDS are analogous to aspects of a class of structures known as a "MIP map." (The word MIP is an acronym of the Latin phrase "multum in parvo", which translates to English as "much in little.") The bounds structure or MLADDS can be represented as one or more MIP maps, but does not necessarily imply all of the specific limitations from the traditional use or construction of MIP maps. More particularly, as will be described herein, the bounds structure or MLADDS of exemplary practices of the present invention, and the manner in which it is employed in connection with the present invention, are distinct from and contrast with previously known uses and constructions of MIP maps. While the term "bounds structure" is also used herein, referring to one form of MLADDS, it will be understood that the invention can be embodied using various forms of MLADDS.

In an exemplary embodiment of the invention, an image (or a signal that may be representative of an image) is preprocessed to create an MLADDS 100 like that schematically depicted in FIG. 1. Each element in a given MIP level encompasses the minimum and maximum values from the MIP level above it. This interval, expressed in an element of the MLADDS, therefore expresses the overall range of all of the contained elements from the original signal.

In particular, on the left-hand side of the MLADDS 100 of FIG. 1 is a column 102 setting forth discrete values from a given search signal (e.g., values 5.1, 5.3, 5.9, etc.). Moving from left to right across FIG. 1, the next column 104 of FIG. 1 represents a MLADDS structure MIP Level 1, followed by column 106 (MIP Level 2), and column 108 (MIP Level 3). Each box of each MIP Level contains a Min value and a Max value representative of minimum and maximum values from the MIP level above it. The dashed lines shown in FIG. 5 as flowing from a given MIP level to a next higher numerically-designated MIP level, indicate how two rows of values from a previous level are represented by a single row of the next higher numerically-designated level.

The example of FIG. 1 illustrates a 2 to 1 MIP reduction, but other MIP reductions are also valid, and may be useful, depending on tradeoffs associated with the hardware involved in the practice of the invention.

A brief discussion about MIP level nomenclature is appropriate here. A longstanding convention in the technology of computer graphics and computer graphics programming, perhaps confusingly, refers to the highest level of a MIP structure which contains the largest number of elements as "MIP level 0" (zero). Subsequent levels of such a structure are referred to as being "lower levels," but counter-intuitively they are conventionally referred to with higher numerical designations. For example, MIP level 3 is a lower level than MIP level 2.

Because the higher resolution levels of a bounds structure in accordance with the present invention, or indeed any type multi-level aggregate structure, may be unneeded to search certain portions of the signal, it may be advantageous to generate only the lowest levels. However, the process of generating a MIP-map-like structure fundamentally offers the opportunity to amortize the work and memory traffic creating successive levels. This is due to the fact that there is a sizable reduction in the amount of data moving from higher resolution levels to lower resolution levels. For this reason it may be more efficient to generate all needed levels of the aggregate structure(s) in one operation rather than beginning by generating only the lowest resolution level and producing higher levels as needed.

Lossless Search Using the MLADDS

Figure 2:
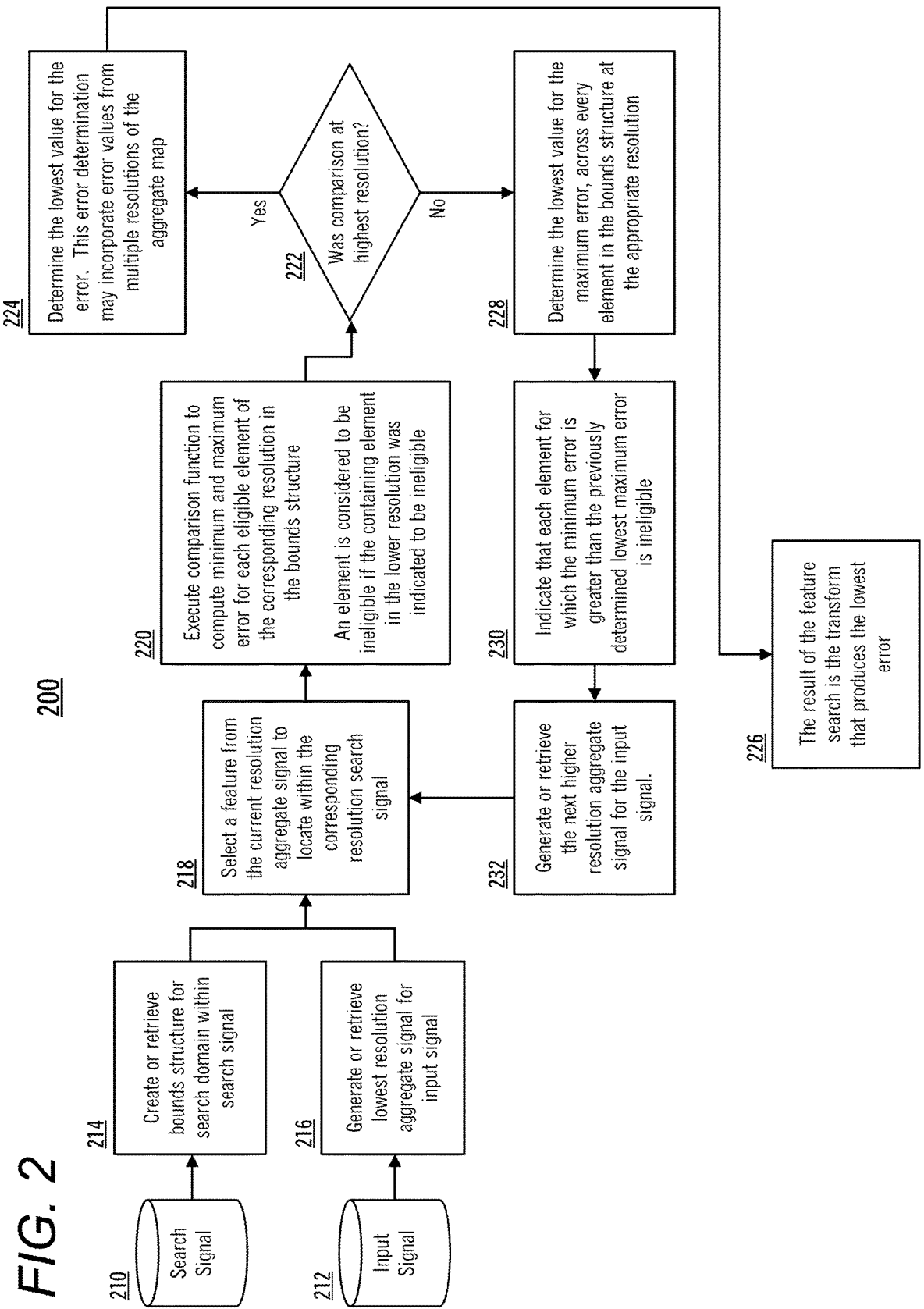
FIG. 2 is a schematic flowchart depicting a lossless search process in accordance with an exemplary practice of the invention.

One aspect of the present invention, depicted by way of example in FIG. 2, involves performing a lossless stereo search using an MLADDS. This technique avoids wasted computation by avoiding the application of the comparison function to data for which the combined error function cannot produce the best result across the search domain. The lossless search is capable of producing the same result as a multi-resolution linear search applied with the same input signal across the same search domain.

In this regard, FIG. 2 is a flowchart depicting a lossless search process 200 in accordance with an exemplary practice of the invention. In particular, FIG. 2 describes an exemplary process of losslessly searching a search signal for correspondence with features from an input signal.

The left-hand side of FIG. 2 indicates the search signal 210 and input signal 212. The search signal 210 is used as an input to operation 214: create or retrieve MLADDS structure for search domain within search signal. The input signal 212 is used as an input signal to operation 216: generate or retrieve lowest resolution aggregate signal for input signal. The result or output of operation 216 is used as an input to operation 218: select feature from current resolution aggregate signal to locate within the corresponding resolution search signal.

The result or output of operation 218 is used as an input to operation 220: execute comparison function to compute minimum and maximum error for each eligible element of the corresponding resolution in the MLADDS structure. As indicated in box 220, in the exemplary practice depicted in FIG. 2, an element is considered to be ineligible if the containing element in the tower resolution was itself indicated to be ineligible.

The result or output of box 220 is used as an input to box 222, a determination of whether the currently executed comparison was at the highest resolution. If "Yes", then the process proceeds to operation 224: determine the lowest value for the error. As noted in box 224, in the exemplary practice depicted in FIG. 2, this error determination may incorporate error values from multiple resolutions of the aggregate map. The result or output of operation 224 yields box 226, which is the output of the lossless search process example depicted in FIG. 2: the result of the feature search is the transform that produces the lowest error.

If the determination of box 222 (determination of whether the currently executed comparison was at the highest resolution) is "No", then the process proceeds to operation 228: determine the lowest value for the maximum error, across every element in the MLADDS structure at the appropriate resolution.

The result or output of determination 228 leads to operation 230; indicate that each element for which the minimum error is greater than the previously determined lowest maximum error is ineligible.

Next, the result or output of operation 230 leads to operation 232: generate or retrieve the next higher resolution aggregate signal for the input signal. The lossless search process thus loops back to box 218: select a feature from the current resolution aggregate signal to locate within the corresponding resolution search signal; and the process iterates.

It should be noted that when this document uses the terms "iterate" or "iteratively", this does not imply a particular order or sequence of execution, or a requirement that the multiple iterations be executed serially; and in fact, operations executed "iteratively" in accordance with the invention can be executed in parallel, by multiple processors or pipelines, and in various orders or sequences.

For a truly lossless search, the aggregate downsampled versions of the input signal must also represent the hounds of the higher resolution input signal elements, in a functionally similar was that the MLADDS structure represents the bounds of the search signal. Then the comparison function must consider two ranges; the range of contained values from each element in the input signal and the range of contained values from each element in the search signal. If those ranges are disjoint, the minimum value for the error is based on the distance between the nearest points in each range. If those ranges overlap, then the minimum error can be zero. Similarly, the maximum error can be based on the distance between the two points in each range that are furthest from each other.

FIG. 3 is a depiction of computational functions 302, 304, in accordance with the invention, that represent one possible method for calculating minimum and maximum error values when comparing two elements, each expressing minimum and maximum signal bounds values. These exemplary functions 302, 304, respectively, are:

> min_error=greater_of(0.0,(search_signal_max_value−input_signal_max_value), (input_signal_min_value−search_signal_max_value))

> max_error=greater_of(absolute_value(input_signal_max_value−search_signal_min_value), absolute_value(search_signal_max_value−input_signal_max_value))

The formulas noted above are with reference to signals that range from 0 (zero) to a positive maximum value. The formulas may require appropriate adjustment for signal ranges that are permitted to cross zero.

Figure 4A:
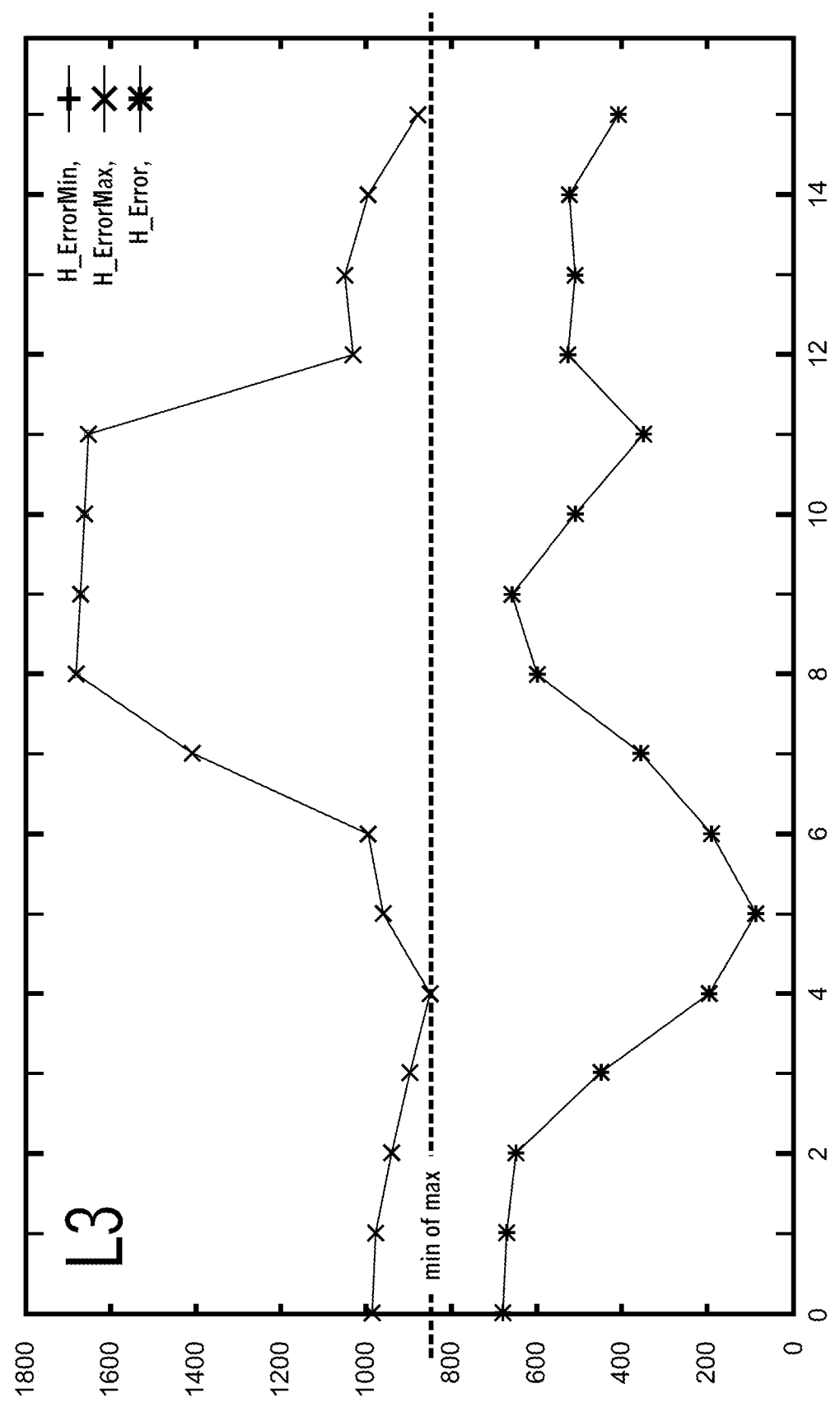
FIG. 4, comprised of sub-figures 4.1, 4.2, 4.3 and 4.4, shows exemplary plots of the minimum and maximum errors for a feature from an input signal compared across a search domain at four separate resolution levels.
Figure 4C:
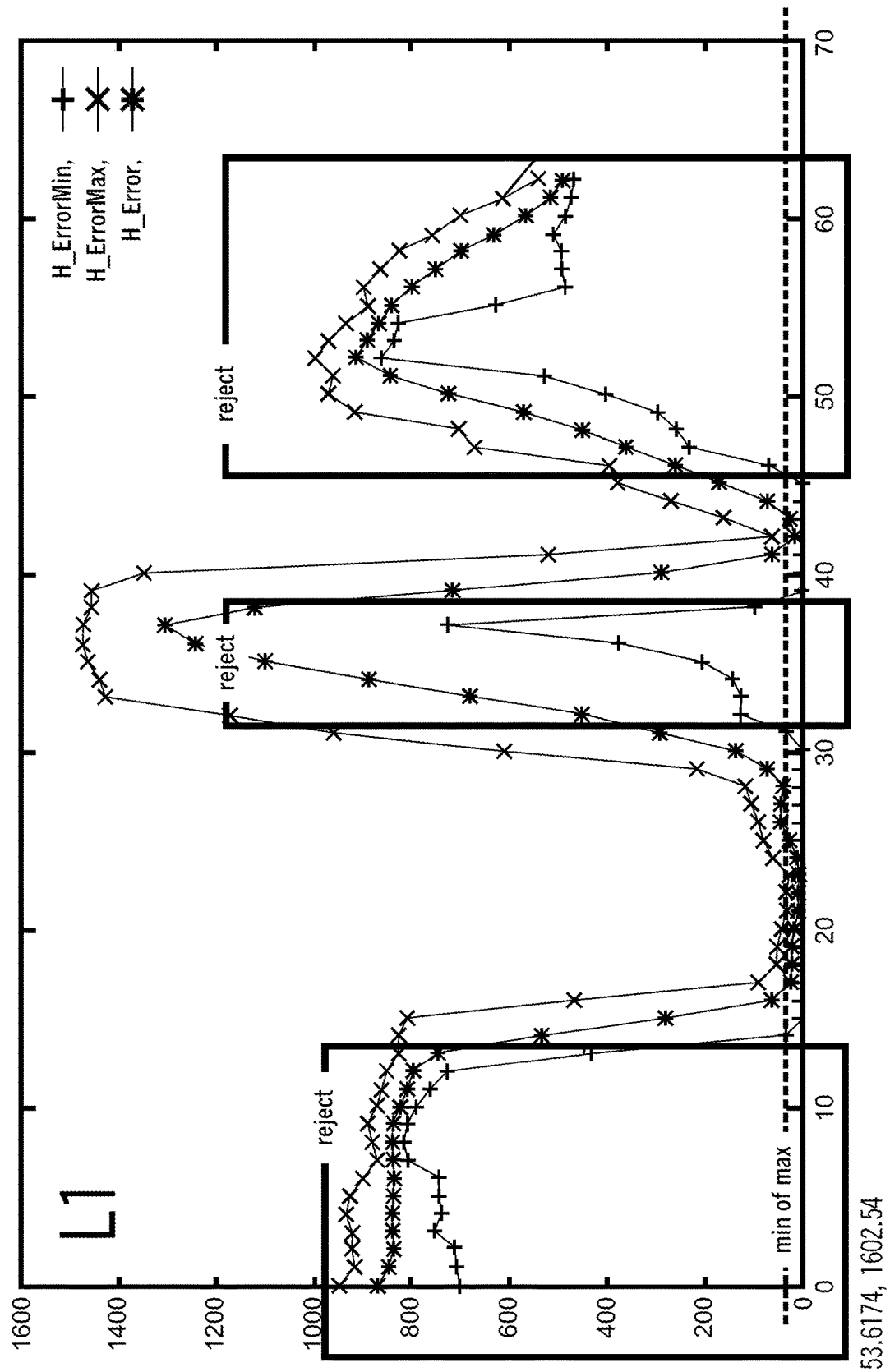
Figure 4D:
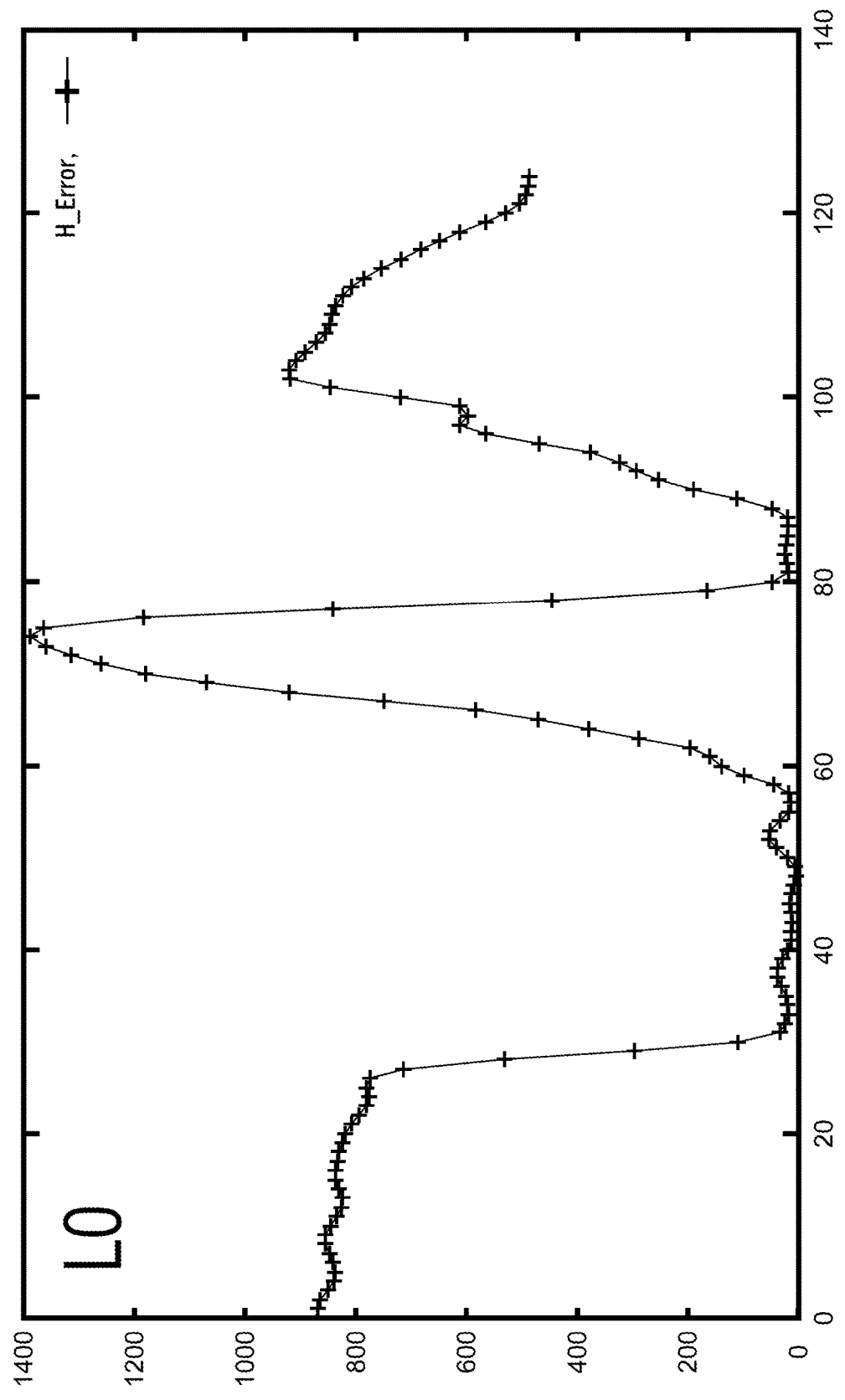

Next, FIG. 4, comprised of sub-figures 4.1, 4.2, 4.3 and 4.4, shows exemplary plots of the minimum and maximum errors for a feature from an input signal compared across a search domain at four separate resolution levels. FIG. 4 highlights areas of the signal that are rejected from further consideration in a lossless search.

By way of example, in FIG. 4.1, fix comparisons at MIP level 3, the lowest value of the maximum error is roughly 850. Because the minimum error is zero across the entire search domain, the search must descend and compare MIP level 2 for all data points in the search domain.

In FIG. 4.2, based on comparisons at mip level 2, the minimum level for the maximum error function across the search domain is around 66. Therefore, all data points in the search signal where the minimum error is higher than the threshold of 66 are ineligible, and therefore are rejected from further consideration. For areas of the search signal that are not rejected, the processing continues to MIP level 1.

As shown in FIG. 4.3, based on comparisons at MIP level 1, more data points can be rejected from the search domain based on the minimum error exceeding the new minimum value for the maximum error.

As shown in FIG. 4.4, the raw signal can be compared for all signal elements that were not rejected in a previous operation.

Acceptable Error

With each increase in resolution, the resulting transform is able to express a correspondingly higher degree of precision. This is due to the increased resolution in the signal allowing finer details to be compared, producing a more accurate result. In many instances, however, this increased precision is not necessary. In some cases, the high precision portion of the transform may even be invalid, due to spurious noise in one or both of the signals. Contrastingly, a high variance in a lower resolution element indicates the potential for a high frequency transition or some other meaningful detail that can be correlated between the signals with high potential accuracy. (It should be noted that the term "variance" is used herein in a manner substantially consistent with its broad English definition. In particular, the term "variance", as used herein, is NOT limited to meaning only the square of the deviation.)

Accordingly, one optimization is to use variance awareness when determining whether to continue the evaluation of the search in a higher resolution of the MLADDS structure. The variance is the absolute value of the difference between the minimum and maximum signal values contained within a lower resolution element of a MLADDS structure. At the highest resolution of a signal, an element represents a singleton sample and therefore the variance is zero, because there is no minimum and maximum signal values that are different from the singleton value itself. In embodiments where it is possible to infinitely subdivide signal elements or manufacture flew samples from an analog source, individual samples would not be singletons.

Variance Aware Search

When the variance of an element falls below a threshold, then the element can be determined not to contain significant detail, and therefore a further examination of higher resolution levels of the signal will likely not produce valuable information.

By way of example, when searching image data or an image data signal, a low resolution element in the MLADDS structure containing many pixels that all display a featureless smooth background will have a very low associated variance. In such a case, the lower precision transforms obtained from the lower resolution versions of the MLADDS structure are likely to be sufficient to adequately represent the transform.

The threshold for variance below which the detail is considered irrelevant may depend on many factors. In the simplest embodiment, the threshold can be a fixed value, or a value calculated from parameters of the systems on which the signals originate. For example, the threshold may be based on the physical properties of the cameras and camera processing pipeline for a stereo image disparity search.

The threshold can also be based on a model. That model may alter the allowable variance threshold depending on numerous other factors and considerations including, but not limited to, one or more of the following: absolute signal values contained with the element, overall signal values across larger sections of a signal, available processing power, perceptual factors, display technology considerations, relative and absolute image positions, inputs from additional connected components, or user supplied inputs or hints.

In one embodiment, the threshold can be adjusted to accommodate the availability of computational resource. For example, the variance at each element could function as a type of prioritization. Elements with the highest variance would then be candidates for further refinement based on higher resolution versions of the signal. This would continue as the variances associated with all transforms across the signal became smaller. In this way, correlations between the signals could be refined as the available processing power allows.

Next, FIG. 5 is a diagram depicting operations performed, in accordance with an exemplary practice of the invention, to search a two-dimensional (2-D) image or image signal. In particular, FIG. 5 illustrates how a multi-dimensional signal can be searched, by execution, for example in a digital processing resource, of operations 500.

The left-hand side of FIG. 5 shows a 12×12 table 502 schematically representing Search Signal Data the central portion of FIG. 5 shows a 6×6 table 504 representing Bounds MIP Level and the right-hand side of FIG. 5 shows a 3×3 table 506 representing Bounds MIP Level 2.

In this example, a 2-D input signal feature is compared with a 2-D search signal using a 3×3 comparison kernel 508, designated by the dark outlines in, e.g., the Search Signal Data table of FIG. 5. After the comparison kernel 508 is evaluated, an indication of eligibility is associated with a representative element of the kernel—in the example depicted in FIG. 5, the center element of the kernel is used. This indication of eligibility is then used to determine whether the element, and any contained or subsumed higher resolution elements, should be rejected from further consideration.

Because the example signal of FIG. 5 uses a 2:1 MIP reduction in each dimension, four comparisons at the higher resolution mip level result from every comparison that is not rejected. If a low resolution element is ineligible, it may be rejected and all contained higher resolution elements are also rejected and therefore not compared. If the low resolution element is eligible, multiple comparisons on the higher resolution signal may be performed. In the noted example, four comparisons are performed for each eligible element.

This approach can be extended into higher dimensions, including images or signals with three or more dimensions. The number of higher resolution elements that must be tested for each lower resolution element will depend on the dimensionality of the signal and the mip reduction factor.

In addition, a signal comprising multiple dimensions may be expressed as a signal comprising fewer dimensions. For example, a given image may be a two dimensional signal, but searching a single scan line involves a similar behavior to searching a one dimensional signal. Successively searching multiple scan lines still preserves the one dimensional behavior for the entire image.

A wide range of search patterns have the same dimension collapsing property, such as, for example, following a Hilbert curve or Morton order.

Implementation Options

In exemplary embodiments and practices of the invention, successive search operations would occur in passes. In one pass, a comparison kernel would find the minimum and maximum error for the kernel. This would be followed by a subsequent operation to determine the minimum value of the maximum error, to be used as a threshold when considering which elements are eligible for further consideration. The next pass would then be responsible for comparing all of the eligible elements at the next mip level, and so on.

In one exemplary practice of the invention, an entire image representing an input signal is processed to create a bound structure. A second image representing a search signal is also processed to create a second search MLADDS structure. Features from the input image and associated MLADDS structure are searched within the search image and associated MLADDS structure by evaluating the comparison kernel in parallel against as much of the image as possible. In this "breadth-first" approach, the algorithm is optimized to saturate all available computation elements.

In another exemplary practice of the invention, each feature from the input signal is tested. If the error is determined to be within acceptable bounds for further processing, then processing can continue to the next level of the MLADDS structure. In this "depth first" approach, the algorithm is optimized to minimize unnecessary computational work and memory traffic. In spite of the more serial nature of this embodiment, multiple features from the input signal can be searched in parallel, so the algorithm can still be amenable to large vector processors.

The present invention can be embodied in software executing on a GPU or similar computational device, processor or resource. It could also be embodied in software executed by a CPU, software executed by a TPU (Tensor Processing Unit), or by dedicated hardware circuitry.

Data created for use in one operation may be retained for future use, or intermediate data can be created on an as-needed basis. This is implementation-specific, and does not alter the invention. For example, one implementation may construct MLADDS structures for an entire input signal and an entire search signal. Then the search operation may select a feature from the input signal to locate within the search domain in the search signal. An additional feature can be selected from the already constructed MLADDS structures and another search operation may occur subsequently or in parallel.

The result of each search operation is a transformation indicating the best correspondence between the feature, subset or snippet from the input signal and its best match in the search signal. A transformation may be inverted to produce a corresponding transformation between the feature in the search signal and the corresponding feature in the input signal. For this reason, which signal is considered the search signal and which signal is considered the input signal may be arbitrary in some implementations. Such an inversion does not fundamentally alter the invention.

Further, some embodiments may choose parts of a signal to behave as a search signal, while parts of the same signal may behave as an input signal.

Various embodiments and practices of the invention have been described above in terms of two signals, but the invention can be extended or implemented to operate with multiple signals simultaneously. For example, one input signal could be compared for correspondence with multiple search signals simultaneously. Alternatively, multiple input signals could be compared against the same search signal. This may be desirable in a system with more than two input devices producing signals requiring correlation, for example a device with three or more cameras.

In other embodiments, the input signal may differ substantially from the search signal in format. In one example, an input signal may comprise an abstract representation to describe the features of the input signal, while the search signal may comprise image data from a camera. Additionally, either the input signal or the search signal or both may comprise one or more of: image data, neural network weights, computer readable instructions, abstract signal descriptions, compressed representations, or combinations of the aforementioned. In such an embodiment, the comparison function would appropriately interpret the data provided from the signal.

Digital Processing Environment in which Invention can be Implemented

Those skilled in the art will understand that the above described embodiments, practices and examples of the invention can be implemented using known network, computer processor and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Visual Basic, Java, C++, and the like. It will also be understood that method operations shown in the flowcharts can be executed in different orders, and that not all operations shown need be executed, and that many other combinations of method operations are Within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicants have implemented aspects of the present invention, in prototype form. One implementation comprises a complete device, including four cameras, capable of encoding content and receiving (full-duplex communication). Another is an Apple iPhone-based implementation that can receive and present immersive content (receive-only). The Applicants used the following hardware and software structures and tools, among others, to create the two noted implementations, collectively:

1. A seven inch 1280×800 IPS LCD display.
2. Four PointGrey Chameleon3 (CM3-U3-13S2C-CS) 1.3 Megapixel camera modules with ⅓' sensor size assembled on an aluminum plate with shutter synchronization circuit.
3. Sunex DSL377A-650-F/2.8 M12 wide-angle lenses.
4. An Intel Core i7-6770HQ processor which includes on-chip the following:
   a. An Intel HD Graphics 580 Integrated Graphics Processing Unit; and
   b. An Intel QuickSync video encode and decode hardware pipeline.
5. OpenCL API using Intel Media SDK running on Linux operating system to implement, among other aspects: Image Rectification, Fast Dense Disparity Estimate(s) (FDDE) and Multi-level Disparity Histogram aspects.
6. OpenGL API running on Linux operating system to implement Multiple Native Disparity Map Voting and image reconstruction.
7. Intel Media SDK to access Intel QuickSync video compression hardware.
8. PhidgetSpatial 0/0/3 Basic accelerometer module and Linux API to determine device orientation.
9. Face Detection library to locate presence of viewer's face.
10. In addition, the Apple iOS SDK was used to access accelerometer, gyroscope and compass for device orientation and to access video decode hardware; and the OpenGL ES API to implement multiple native disparity map voting and image reconstruction to enable an iPhone-based prototype of a receiving device.

Flowcharts of Exemplary Practices of the Invention

FIGS. 6-22 are flowcharts illustrating method aspects and exemplary practices of the invention. The methods and elements depicted in these flowcharts are examples only; the organization, groupings, order and number of operations in the exemplary practices can be varied; and the exemplary practices and methods can be grouped, arranged or ordered differently, and include different or additional functions, whether singly or in combination, while still being within the spirit and scope of the present invention.

Elements shown in the flowcharts in parentheses are, among other aspects, optional in a given practice of the invention.

All the text and respective textual elements of the accompanying flowcharts are incorporated by reference into this Detailed Description of the Invention as if set forth in their entireties in this Detailed Description of the Invention, in the respective order in which they appear in the flowcharts, while noting that the grouping, organization, order and number of operations in the exemplary practices can be varied; and the exemplary practices and methods can be arranged or ordered differently, and include different or additional functions.

In particular, FIG. 6 shows a method 600 for searching for correspondence between a first selected feature in a first image and an element within a selected search domain in a second image, according to an exemplary practice of the invention, comprising the following operations:

600. Searching for Correspondence Between a First Selected Feature in a First Image and an Element within a Selected Search Domain in a Second Image

601. Utilize multi-level aggregate digital data structure representative of second image, the multi-level aggregate digital data structure comprising digital data representations at different resolutions;

602. Compare a relatively lower resolution digital data representation of the first selected feature against a relatively lower resolution digital data representation of a first selected subset of the selected search domain in the multi-level aggregate data structure, the comparing comprising computation of a minimum difference value and a maximum difference value;

603. Iteratively execute the comparing (602) against other subsets of the selected search domain;

604. Identify a threshold difference value based on maximum difference values from the comparisons against subsets of the selected search domain;

605. Reject subsets for which the comparison results in minimum difference values that exceed the identified threshold difference value.

FIG. 7A shows a method 700 for determining disparity between a first image and a second image, according to an exemplary practice of the invention, comprising the following operations:

700. Determining Disparity Between a First Image and a Second Image

701. Generate a multi-level aggregate digital data structure representative of the second image, the multi-level aggregate digital data structure comprising digital data representations at different resolutions;

702. Select a first feature from the first image;

703. Search for a corresponding element within the second image, utilizing a selected search method, the corresponding element having correspondence with the selected feature from the first image;

704. Based on results of the search, record correspondence information relating to correspondence between the selected feature and the corresponding element;

705. Iteratively execute the selecting (702), the searching (703) and the recording (704), using other selected features from the first image, to construct a digital map of correspondences for the selected features from the first image.

FIG. 7B shows a selected search method, useful, for example, in element 703 of FIG. 7A (which in turn shows a method for determining disparity between a first image and a second image), according to an exemplary practice of the invention, comprising the following operations:

750. Selected Search Method (Useful in, e.g., Element 703 of FIG. 7A)

751. Compare a relatively lower resolution digital data representation of the first selected feature against a relatively lower resolution digital data representation of a first selected subset of a selected search domain in the multi-level aggregate data structure, the comparing comprising computation of a minimum difference value and a maximum difference value;

752. Iteratively execute the comparing (751) against other subsets of the selected search domain;

753. Identify a threshold difference value based on maximum difference values from the comparisons against subsets of the selected search domain;

754. Reject subsets for which the comparison results in minimum difference values that exceed the identified threshold difference value;

755. Then, iteratively execute the comparing (751), the comparing (752), the identifying (753), and the rejecting (754), using higher resolution digital data representations of the first selected feature and higher resolution digital data representations in the multi-level aggregate structure;

756. Output correspondence information associated with the subset of the search domain for which the difference value is lowest.

FIG. 8 shows a method 800 for searching for correspondence between a first selected feature in an input signal and an element within a selected search domain in a search signal, according to an exemplary practice of the invention, comprising the following operations:

800. Searching for Correspondence Between a First Selected Feature in an Input Signal and an Element within a Selected Search Domain in a Search Signal

801. Utilize a multi-level aggregate digital data structure representative of the search signal, the multi-level aggregate digital data structure comprising digital data representations at different resolutions;

802. Compare a relatively lower resolution digital data representation of the first selected feature against a relatively lower resolution digital data representation of a first selected subset of the selected search domain in the multi-level aggregate data structure, the comparison comprising computation of a minimum difference value and a maximum difference value;

803. Iteratively execute the comparing (802) against other subsets of the selected search domain;

804. Identify a threshold difference value based on maximum difference values from the comparisons against subsets of the selected search domain;

805. Rejecting subsets for which the comparison results in minimum difference values that exceed the identified threshold difference value.

FIG. 9 shows a method 900 for variance-aware searching for correspondence between a first selected feature in a first image and an element within a selected search domain in a second image, according to an exemplary practice of the invention, comprising the following operations:

900. Variance-Aware Searching for Correspondence Between a First Selected Feature in a First Image and an Element within a Selected Search Domain in a Second Image

901. Utilize a multi-level aggregate digital data structure representative of the second image, the multi-level aggregate digital data structure comprising digital data representations at different resolutions;

902. Compare a digital data representation of the first selected feature, at a given resolution, against a digital data representation of a first selected subset of the selected search domain, at a given resolution, in the multi-level aggregate data structure;

903. Determine, based on the comparing, a variance value for the first selected subset;

904. Utilize the variance value to determine Whether to execute another comparing operation in a higher resolution digital data representation in the multi-level aggregate structure, wherein, if the determined variance value is less than a selected threshold value, then not executing another comparing operation for the first selected subset in a higher resolution digital data representation in the multi-level aggregate structure.

FIG. 10 shows a method 1000 for variance-aware searching for correspondence between a first selected feature in an input signal and an element within a selected search domain in a search signal, according to an exemplary practice of the invention, comprising the following operations:

1000. Variance-Aware Method of Searching for Correspondence Between a First Selected Feature in an Input Signal and an Element within a Selected Search Domain in a Search Signal 1001. Utilize a multi-level aggregate digital data structure representative of the search signal, the multi-level aggregate digital data structure comprising digital data representations at different resolutions;

1002. Compare digital data representation of the first selected feature, at a given resolution, against a digital data representation of a first selected subset of the selected search domain, at a given resolution, in the multi-level aggregate data structure;

1003: determine, based on the comparing, a variance value for the first selected subset;

1004: utilize the variance value to determine whether to execute another comparing operation in a higher resolution digital data representation in the multi-level aggregate structure, wherein, if the determined variance value is less than a selected threshold value, then not executing another comparing operation for the first selected subset in a higher resolution digital data representation in the multi-level aggregate structure.

FIG. 11 shows a method 1100 for lossless search for correspondence between a first selected feature in a first image and an element within a selected search domain in a second image, according to an exemplary practice of the invention, comprising the following operations:

1100. Lossless Search for Correspondence Between a First Selected Feature in a First Image and an Element within a Selected Search Domain in a Second Image 1101. Utilize a first multi-level aggregate digital data structure representative of the selected feature, the first multi-level aggregate digital data structure comprising digital data representations at different resolutions;

1102. Utilize a second multi-level aggregate digital data structure representative of a first selected subset of the selected search domain, the second multi-level aggregate digital data structure comprising digital data representations at different resolutions;

1103. Compare a digital data representation of the selected feature, at a given resolution, to a digital data representation of the first selected subset of the selected search domain, at a given resolution, and compute, based on the comparing, minimum and maximum error for each eligible data element of the digital data representation at the given resolution in the multi-level aggregate digital data structure, wherein an data element is considered to be ineligible if a subsuming data element in a corresponding lower resolution was indicated to be ineligible;

1104. If the currently executed comparison was at a highest possible resolution, then determine the lowest value for the error, wherein (1) the error determination can incorporate error values from multiple resolutions of the multi-level aggregate digital data structure, and (2) the result of the search is a transform that produces the lowest error.

FIG. 12 shows a method 1200 for searching for correspondence between a first selected texture in a first image and an element within a selected search domain in a second image, according to an exemplary practice of the invention, comprising the following operations:

1200. Searching for Correspondence Between a First Selected Feature in a First Image and an Element within a Selected Search Domain in a Second Image 1201. Compare a digital data representation of the selected feature from the first image against a digital data representation of a selected subset of the selected search domain in the second image;

1202. Determine, for a given comparison, an error value corresponding to the given comparison, the error value being representative of the degree to which the selected feature from the first image corresponds with the selected subset of the selected search domain in the second image when the comparing is executed in accordance with selected processing parameters;

1203. Iteratively execute the comparing and determining, while applying selected changes to the processing parameters across the selected subset of the selected search domain, until processing parameters resulting in a smallest error value are found;

1204. Estimate minimum and maximum possible errors for con for the selected feature in the first image at a full resolution, by executing the comparing and determining at reduced resolution on multi-level aggregate digital data structures representative of the first image and the selected subset of the selected search domain in the second image, respectively.

FIG. 13 shows a method 1300 for searching for a correspondence between a first selected feature in a first image and an element within a selected search domain in a second image, according to an exemplary practice of the invention, comprising the following operations:

1300. Searching for a Correspondence Between a First Selected Feature in a First Image and an Element within a Selected Search Domain in a Second Image 1301. Compare a digital data representation of the selected feature from the first image against a digital data representation of a selected subset of the selected search domain in the second image;

1302. Determine, for a given comparison, an error value corresponding to the given comparison, the error value being representative of the degree to which the selected feature from the first image corresponds with the selected subset of the selected search domain in the second image when the comparing is executed in accordance with selected processing parameters;

1303. Iteratively execute the comparing and determining, while applying selected changes to the processing parameters across the selected subset of the selected search domain, until processing parameters resulting in a smallest error value are found;

1304. Utilize, in executing the comparing, a multi-level aggregate digital data structure containing digital data representations at different resolution levels.

FIG. 14 depicts additional aspects relating to the MLADDS, searching, and other aspects of the invention, as follows:

1400. MLADDS: Comparison Function, Searching: Other Aspects (1401. MLADDS has configuration substantially similar to a MIP map.)

(1402. The comparing can utilize a selected error function.)

(1403. The comparing can utilize a selected comparison function.)

(1404. The comparison function can comprise a kernel.)

(1405. Apply error function in executing the comparing produces a scalar error value for a given transform.)

(1406. Error function comprises a comparison function and selected logic applicable to weight results of individual comparisons.)
(1407. Second image is pre-processed to generate a MLADDS structure in which each element in a given resolution level subsumes the minimum and maximum values from the resolution level above the given resolution level.)
(1408. MLADDS is characterized by a selected reduction ratio.)
(1409. Only selected resolution levels of the MLADDS are created in an initial structure generating operation.)
(1410. Only selected lowest resolution levels of the MLADDS structure are generated in an initial structure generating operation.)
(1411. All levels of the MLADDS projected to be required in executing the comparing are generated in an initial structure generating operation.)
(1412. All levels of the MLADDS are generated in an initial, digital aggregation data structure generating operation.)
(1412. Execute a lossless search operation using the MLADDS structure.)

FIG. 15 depicts a further aspect 1500 of processing in which:
(1501. If the currently executed comparison was not at the highest possible resolution, searching can further comprise:
 1501.1 determining the lowest value for the maximum error across every element in the MLADDS at the currently selected resolution;
 1501.2 indicating that each element for which the minimum error is greater than the determined lowest maximum error is ineligible;
 1501.3 access a next higher resolution MLADDS representative of the first image; and
 1501.4 returning to selecting a feature from the current resolution MLADDS structure to locate within the corresponding resolution MLADDS representative of the second image.)

FIG. 16 shows additional aspects relating to lossless search and other aspects, as follows:
1600. Lossless Search, Down-sampled versions, Other Aspects
(1601. In executing a lossless search, aggregate down-sampled versions of the first image, represented by a currently selected bounds structure, represent the bounds of the higher resolution first image elements)
(1602. Aggregate down-sampled versions of the first image represent the bounds of the higher resolution first image elements in a manner analogous to the respective bounds structure representing the bounds of the second image)
(1603. Executed comparison function considers two ranges, wherein the first range is the range of subsumed values from each element in the first image and the second range is the range of subsumed values from each element in the second image)
(1604. If the first and second ranges are disjoint, the minimum value for the error is based on the distance between the nearest points in each range)
(1605. If the first and second ranges overlap, the minimum error can be zero, and the maximum error can be based on the distance between the two points in each range that are furthest from each other)
(1606. Applying variance awareness to determine whether to continue execution of search operations in a next-higher resolution level of a bounds structure)
(1607. Variance is defined as the absolute value of the difference between the minimum and maximum values contained in a lower resolution element of the bounds structure)
(1608. Select threshold for variance below which corresponding image detail is considered irrelevant)
(1609. Variance threshold is a selected fixed value)
(1610. Variance threshold is determined, in the processing structure, based on parameters of the images or of the devices or systems from which the images originate)
(1611. Variance threshold is determined based on physical, properties of cameras and camera processing elements associated with a stereo image disparity search)
(1612. Variance threshold is determined based on a selected model)
(1613. Model alters the variance threshold based on selected criteria)
(1614. Selected criteria comprise any of absolute signal values contained within a currently selected element of a currently selected bounds structure; overall image-representative values across larger sections of an image being searched; available processing power; human perceptual factors; display technology considerations; relative and absolute image positions, inputs from additional connected components; or user-supplied inputs or hints).

FIG. 17 shows features relating to variance threshold and other aspects, as follows:
1700: Variance Threshold, Other Aspects
(1701. Adjust the variance threshold based on availability of computational or processing power or resources);
(1702. Adjust variance threshold to selectively prioritize execution of computational operations);
(1703. MLADDS elements with highest variance are designated as candidates for further refinement based on higher resolution versions of a selected image);
(1704. Iteratively repeat the designating as variances associated with all transforms across a given image being processed become smaller, such that correlations between images are refined as available computational or processing power permits).

FIG. 18 shows features relating to multi-dimensional signal or image data and other aspects, as follows:
1800: Multi-Dimensional Aspects, Other Aspects
(1801. Apply correspondence searching operations to multi-dimensional image data)
(1802. Image data has n dimensions, and n is equal to or greater than 3)
(1803. Applying correspondence searching operations to multi-dimensional image data comprises: in a digital processing structure, search a multi-dimensional image data field using a selected comparison kernel.)
(1804. Using a selected comparison kernel comprises; evaluate the selected comparison kernel; then, based on the evaluation, associating, with a representative element of the kernel, a designation of eligibility; and then utilize the designation of eligibility to determine whether the representative element, and any contained higher resolution elements, should be rejected from further consideration)
(1805. If a selected relatively lower resolution element is designated ineligible, rejecting the selected lower resolution element and rejecting any corresponding subsumed higher resolution elements)
(1806. If a selected relatively lower resolution element is designated eligible, execute comparison operations on contained higher resolution elements.)

(1807. Express an n-dimensional image data field in a form comprising fewer than n dimensions, by applying a dimension collapsing operation)
(1808. Applying a dimension collapsing operation comprises executing a search characterized by a selected search pattern)
(1809. Search pattern comprises a scan line search.)
(1810. Search pattern comprises a Hilbert curve.)
(1811. Search pattern comprises as Morton order.)
(1812. Successive search operations are executed multiple passes through data to be searched.)
(1813. Evaluation of a comparison kernel finds the minimum and maximum error for the kennel.)
(1814. Subsequent pass comprises determining the minimum value of the maximum error for the kernel, to be used as a threshold when determining which elements are eligible for further consideration.)
(1815. Further subsequent pass comprises comparing all eligible elements at a next resolution level.)

FIG. 19 shows features relating to execution of processing operations and other aspects, as follows:

1900: Execution of Processing Operations: Other Aspects
(1901. First image, representing an input image, is processed to create a first bounds structure; second image, representing a search image, is processed to create a second bounds structure; and features from the input image and associated first bounds structure are searched within the search image and associated second bounds structure by evaluating a selected comparison kernel in parallel against as much of the search image as possible)
(1902. Optimize execution of processing operations to substantially fully utilize all available digital processing resources)
(1903. Tests selected feature of the input image against a selected search domain in the second image, and generate therefrom, resultant error values; and if the resultant error is value is within a selected threshold designated for further processing, then continuing processing at a next resolution level of the associated bounds structure)
(1904. Optimize execution of processing operations to minimize computational work and memory traffic.)
(1905. Multiple features oldie input image are tested in parallel against the selected search domain.)
(1906. Processing operations are executed in accordance with digital instructions executing on a computing device.)
(1907. Computing device comprises a GPU, a CPU, or a TPU).
(1908. Processing operations are executed by dedicated hardware circuitry.)
(1909. Data generated for use in a given processing operation are retained for future use.)
(1910. Data for use in a given processing operation are generated on an as-needed basis.)

FIG. 20 shows additional aspects, as follows:

2000. Additional Aspects
(2001. Generate first MLADDS representative of the input image and a second MLADDS representative of the search image; selecting a first feature from the input image to locate within a selected search domain in the search image and executing a search operation for the selected first feature; and select additional feature from the generated structures and execute a search operation for the additional feature)
(2002. Search operation for the additional feature is executed after execution of the search operation for the selected first feature.)
(2003. Search operation for the additional feature is executed in parallel with the search operation for the selected first feature.)
(2004. Result of a given search operation is a transform indicating a best correspondence between a feature from the input image and a best match for the input image feature in the search image.)
(2005. Transform is invertible to generate a corresponding transform between a corresponding feature in the search image and a corresponding feature in the input image.)
(2006. Selecting a first portion of a given image to be a search image, and selecting a second, different portion of the given image to be an input image.)
(2007. Applying comparison and search processes across a plurality of images simultaneously, such that one input image is simultaneously compared for correspondence with more than one search image.)
(2008. Applying comparison and search processes across a plurality of images simultaneously, such that multiple input images are simultaneously compared for correspondence with a given search image.)
(2009. Input image differs in format from the search image.)
(2010. Input signal and search signal can be 1-dimensional signals.)
(2011. Executing a transform to enable comparison between an input image and a search image of different formats.)
(2012. Applied comparison function adaptively interprets different respective sets of data associated with each image, to enable comparison between an input image and a search image of different formats.)

FIG. 21 shows features relating to input and search, images/signals, as follows:

2100. Input Image/Signal: Search Image/Signal
(2101. Comparison function enables comparison of an input signal and a search signal.)
(2102. Input signal and the search signal are of different formats.)
(2103. Either the input signal or the search signal comprises any of: image data, pixel depth data, 3-dimensional point data, 3-dimensional vertex data, LIDAR data, neural network weights, computer readable instructions, abstract signal descriptions, compressed representations, audio data, market data, price signal data, or analytics.)
(2104. Either the input signal or the search signal comprises a combination of any of: image data, pixel depth data, 3-dimensional point data, 3-dimensional vertex data, LIDAR data, neural network weights, computer readable instructions, abstract signal descriptions, compressed representations, audio data, market data, price signal data, or analytics.)
(2105. One of the input signal or the search signal comprises an abstract representation describing features of the given signal, and the other signal comprises image data.)

FIG. 22 shows additional aspects of exemplary practices of the invention, as follows:

2200. Additional Aspects
(2201. The computation of a minimum difference value and a maximum difference value can comprise computation of an estimated minimum difference value and an estimated maximum difference value.)
(2202. Executing search and further: iteratively executing the comparing and rejecting aspects, using higher resolution digital data representations of the first selected feature and higher resolution digital data representations in the multi-level aggregate structure)

(2203. The first and second images are images captured by at least one camera from different viewpoints of substantially the same scene.)
(2204. The selected search domain is selected based on the relative positions of the respective viewpoints of the first and second images.)
(2205. The first and second images are rectified to a common projection such that selected search domain within the second image is oriented along a selected axis of the second image)
(2206. The correspondence information can be a transform)
(2207. The correspondence information can be an offset representing a position within the search domain.)
(2208. The correspondence information can be a 2-dimensional value representing a position within an image.)
(2209. The correspondence information can be computed based on it known difference in viewpoints between first and second cameras that captured the first and the second image, respectively.)
(2210. The correspondence information can be a disparity value representing the distance between the location of the first selected feature in the first image and the location of the corresponding element in the second image.)
(2211. The selected feature can be a pixel)
(2212. The selected feature can be a matrix of pixels.)
(2213. The matrix of pixels can be a structure of adjacent pixels.)
(2214. The multi aggregate data structure contains elements; each lower resolution element comprising the minimum and maximum values for one or more higher resolution elements)
(2215. Process can further include comparing a digital data representation of the selected feature from the first image, at a given resolution, against a digital data representation of a first selected subset of a selected search domain in the second image, at a given resolution, in the multi-level aggregate digital data structure; determining, based on the comparing, a variance value for the first selected subset; and utilizing the variance value to determine whether to execute another comparing operation in a higher resolution digital data representation in the multi-level aggregate digital data structure, wherein, if the determined variance value is less than a selected threshold value, then not executing another comparing operation for the first selected subset in a higher resolution digital data representation in the multi-level aggregate digital data structure.)
(2216. Process can further include iteratively execute the comparing, identifying and rejecting functions, using higher resolution digital data representations of the first selected feature and higher resolution digital data representations in the multi-level aggregate structure, and rejecting comparison results having difference values above the threshold difference value).

Block Diagram of Exemplary Embodiment(s) of the Invention

Figure 23:
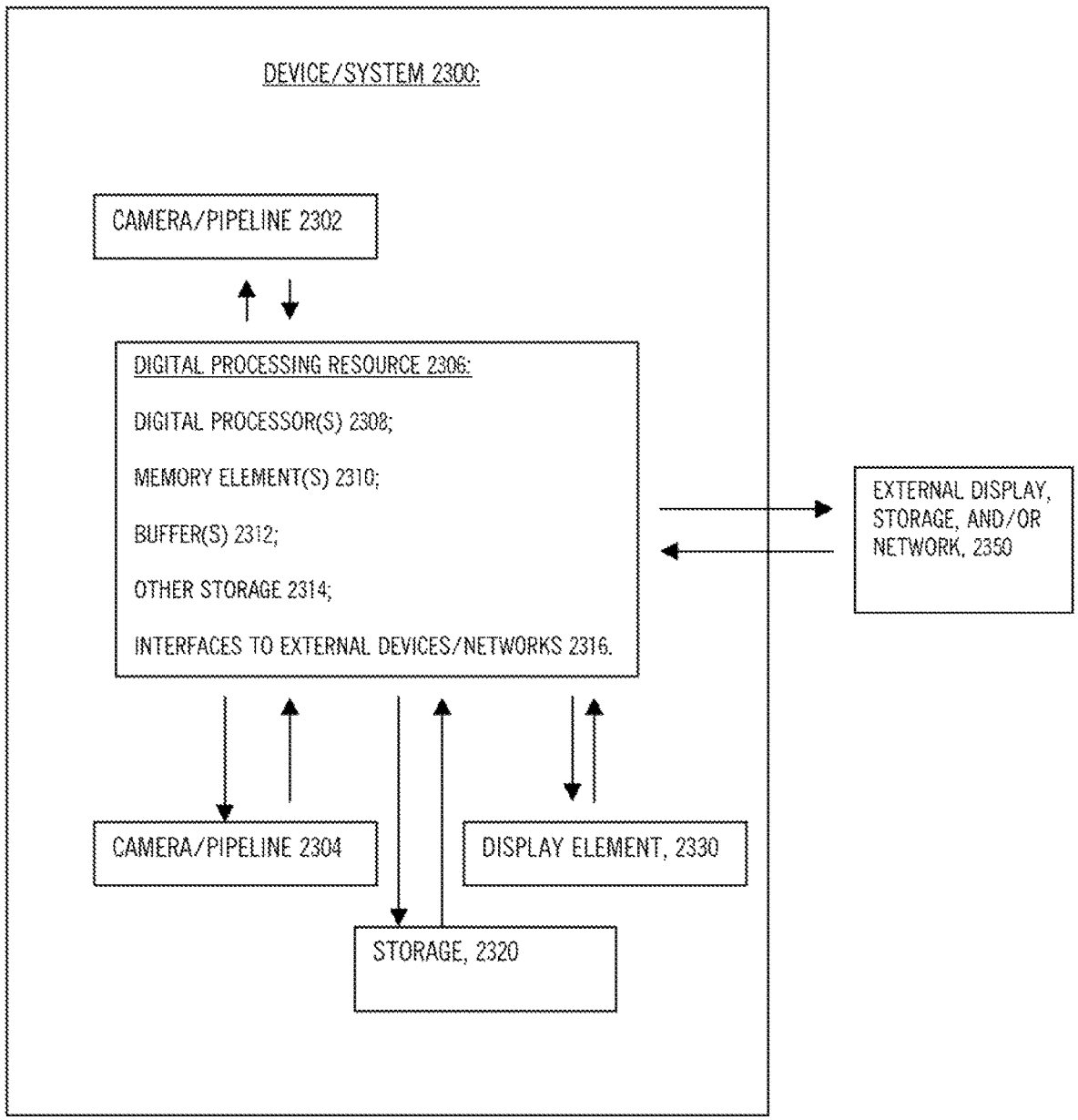
FIG. 23 is a schematic block diagram depicting exemplary devices or systems in which aspects of the present invention may be practiced or embodied.

FIG. 23 is a schematic block diagram depicting exemplary devices or systems in which aspects of the present invention may be practiced or embodied.

In particular, FIG. 23 is a schematic block diagram showing a device or system 2300 in which the invention may be practiced. The device or system 2300 may be implemented using known forms of digital processing hardware, such as known forms of smartphones, tablets and/or other forms of digital processing and imaging devices, supplemented as necessary in accordance with the teachings of the present invention. Arrows in FIG. 23 indicate flow of digital data and/or signals between elements.

By way of example, device of system 2300 can comprise at least a first digital camera or camera pipeline 2302, a second digital camera or camera pipeline 2304, and a digital processing resource 2306 comprising one or more digital processor(s) 2308, memory element(s) 2310, buffer(s) 2312, other storage 2314, and interfaces 2316 to external devices and/or networks.

In accordance with the teachings of the invention, such as discussed above, the digital processing resource 2306 is operable to receive digital data from the cameras or camera pipelines 2302, 2304, process the data in accordance with the invention, and provide outputs, based on such processing, to internal (i.e., within device or system 2300) display element 2330 or storage 2320; and/or to external display, storage or network elements (collectively 2350).

The external display, storage or network elements 2350 may comprise the Internet, devices, processors or other networks connected to or via the Internet, or other network-connected elements or destinations.

In addition, the digital processing resource may receive or consume digital information from such a network or networks 2350, such as for processing by the digital processing resource 2306.

Conclusion

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method for determining disparity between a first image and a second image, the method comprising:
   in a digital processing resource comprising a digital processor:
   A) generating a multi-level aggregate digital data structure representative of the second image, the multi-level aggregate digital data structure comprising digital data representations at different resolutions;
   B) selecting a first image feature from the first image;
   C) searching for a corresponding element within the second image, utilizing a selected search method, the corresponding element having correspondence with the selected image feature from the first image;
   D) based on results of the search, recording correspondence information relating to correspondence between the selected image feature and the corresponding element; and
   E) iteratively executing the selecting (B), the searching (C) and the recording (D), using other selected image features from the first image, to construct a digital map of correspondences for the selected image features from the first image, thereby to determine stereo image disparity between the first image and the second image;
   wherein the selected search method comprises:
   (i) comparing a relatively lower resolution digital data representation of the first selected image feature against a relatively lower resolution digital data representation of a first selected subset of a selected search domain in the multi-level aggregate data structure, the comparing comprising computation of a minimum difference value and a maximum difference value;

(ii) iteratively executing the comparing (i) against other subsets of the selected search domain;
(iii) identifying a threshold difference value based on maximum difference values from the comparisons against subsets of the selected search domain; and
(iv) rejecting subsets for which the comparison results in minimum difference values that exceed the identified threshold difference value.

2. The method of claim 1 wherein the selected search method further comprises:
iteratively executing the comparing (i), the comparing (ii), the identifying (iii), and the rejecting (iv), using higher resolution digital data representations of the first selected image feature and higher resolution digital data representations in the multi-level aggregate structure; and
outputting correspondence information associated with the subset of the search domain for which the difference value is lowest.

3. The method of claim 2 wherein the correspondence information is an offset representing a position within the search domain.

4. The method of claim 2 wherein the correspondence information is a 2-dimensional value representing a position within an image.

5. The method of claim 2 wherein the correspondence information is a disparity value representing the distance between the location of the first selected image feature in the first image and the location of the corresponding element in the second image.

6. The method of claim 1 where the image feature is a pixel.

7. The method of claim 1 where the image feature is a matrix of pixels.

8. The method of claim 7 wherein the matrix of pixels is a structure of adjacent pixels.

9. The method of claim 1 further comprising:
in a digital processing resource comprising a digital processor:
A) comparing a digital data representation of the selected image feature from the first image, at a given resolution, against a digital data representation of a first selected subset of a selected search domain in the second image, at a given resolution, in the multi-level aggregate digital data structure;
B) determining, based on the comparing, a variance value for the first selected subset; and
C) utilizing the variance value to determine whether to execute another comparing operation in a higher resolution digital data representation in the multi-level aggregate digital data structure, wherein, if the determined variance value is less than a selected threshold value, then not executing another comparing operation for the first selected subset in a higher resolution digital data representation in the multi-level aggregate digital data structure.

10. The method of claim 1 wherein the selected search method comprises comparing a digital data representation of the first selected image feature against a digital data representation of a first selected subset of a selected search domain in the multi-level aggregate data structure, and the comparing utilizes a selected error function.

11. The method of claim 10 wherein the error function comprises a comparison function and selected logic applicable to weight results of individual comparisons.

12. The method of claim 1 wherein the selected search method comprises comparing a digital data representation of the first selected image feature against a digital data representation of a first selected subset of a selected search domain in the multi-level aggregate data structure, the comparing utilizes a selected comparison function, and the comparison function comprises a kernel.

13. The method of claim 1 wherein the second image is pre-processed to generate a multi-level aggregate digital data structure, in which each element in a given resolution level subsumes the minimum and maximum values from the resolution level above the given resolution level.

14. The method of claim 13 wherein the multi-level aggregate digital data structure is characterized by a selected reduction ratio.

15. The method of claim 1 wherein:
the first and second images are images captured by at least one camera from different viewpoints of substantially the same scene;
a search domain within the second image is selected based on the relative positions of the respective viewpoints of the first and second images; and
the first and second images are rectified to a common projection such that the selected search domain within the second image is oriented along a selected axis of the second image.

16. A system for determining disparity between a first image and a second image, the system comprising:
a digital processing resource comprising a digital processor, the digital processing resource being configured to:
A) generate a multi-level aggregate digital data structure representative of the second image, the multi-level aggregate digital data structure comprising digital data representations at different resolutions;
B) select a first image feature from the first image;
C) search for a corresponding element within the second image, utilizing a selected search method, the corresponding element having correspondence with the selected image feature from the first image;
D) record, based on results of the search, correspondence information relating to correspondence between the selected image feature and the corresponding element; and
E) iteratively execute the selecting (B), the searching (C) and the recording (D), using other selected image features from the first image, to construct a digital map of correspondences for the selected image features from the first image, thereby to determine stereo image disparity between the first image and the second image,
wherein the selected search method comprises:
(i) comparing a relatively lower resolution digital data representation of the first selected image feature against a relatively lower resolution digital data representation of a first selected subset of a selected search domain in the multi-level aggregate data structure, the comparing comprising computation of a minimum difference value and a maximum difference value;
(ii) iteratively executing the comparing (i) against other subsets of the selected search domain;
(iii) identifying a threshold difference value based on maximum difference values from the comparisons against subsets of the selected search domain; and
(iv) rejecting subsets for which the comparison results in minimum difference values that exceed the identified threshold difference value.

17. A program product for use with a digital processing system to enable the digital processing system to determine disparity between a first image and a second image, the digital processing system comprising a digital processing resource, the digital processing resource comprising a digital processor, the program product comprising digital processor-executable program instructions stored on a non-transitory digital processor-readable medium, which when executed in the digital processing resource cause the digital processing resource to:

A) generate a multi-level aggregate digital data structure representative of the second image, the multi-level aggregate digital data structure comprising digital data representations at different resolutions;

B) select a first image feature from the first image;

C) search for a corresponding element within the second image, utilizing a selected search method, the corresponding element having correspondence with the selected image feature from the first image;

D) record, based on results of the search, correspondence information relating to correspondence between the selected image feature and the corresponding element; and E) iteratively execute the selecting (B), the searching (C) and the recording (D), using other selected image features from the first image, to construct a digital map of correspondences for the selected image features from the first image, thereby to determine stereo image disparity between the first image and the second image, wherein the selected search method comprises:

(i) comparing a relatively lower resolution digital data representation of the first selected image feature against a relatively lower resolution digital data representation of a first selected subset of a selected search domain in the multi-level aggregate data structure, the comparing comprising computation of a minimum difference value and a maximum difference value;

(ii) iteratively executing the comparing (i) against other subsets of the selected search domain;

(iii) identifying a threshold difference value based on maximum difference values from the comparisons against subsets of the selected search domain; and (iv) rejecting subsets for which the comparison results in minimum difference values that exceed the identified threshold difference value.

* * * * *